(12) United States Patent
Moody

(10) Patent No.: US 9,946,931 B2
(45) Date of Patent: *Apr. 17, 2018

(54) CHANGE DETECTION AND CHANGE MONITORING OF NATURAL AND MAN-MADE FEATURES IN MULTISPECTRAL AND HYPERSPECTRAL SATELLITE IMAGERY

(71) Applicant: Los Alamos National Security, LLC, Los Alamos, NM (US)

(72) Inventor: Daniela Irina Moody, Los Alamos, NM (US)

(73) Assignee: Los Alamos National Security, LLC, Los Alamos, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 15/133,387

(22) Filed: Apr. 20, 2016

(65) Prior Publication Data

US 2016/0307073 A1    Oct. 20, 2016

Related U.S. Application Data

(60) Provisional application No. 62/149,933, filed on Apr. 20, 2015.

(51) Int. Cl.
G06K 9/00        (2006.01)
G06K 9/62        (2006.01)

(52) U.S. Cl.
CPC ....... G06K 9/0063 (2013.01); G06K 9/00536 (2013.01); G06K 9/6218 (2013.01)

(58) Field of Classification Search
CPC . G06K 9/00536; G06K 9/0063; G06K 9/6218
See application file for complete search history.

(56) References Cited

U.S. PATENT DOCUMENTS 5,631,970 A    5/1997  Hsu
6,424,960 B1*  7/2002  Lee .................. G06K 9/624
                                                        600/310

(Continued)

OTHER PUBLICATIONS

Amir Alavi, "Notice of Allowance", dated Apr. 11, 2017 for U.S. Appl. No. 14/668,900.

(Continued)

*Primary Examiner* — Edward Park
(74) *Attorney, Agent, or Firm* — LeonardPatel PC; Michael Aristo Leonard, II; Sheetal Suresh Patel

(57) ABSTRACT

An approach for land cover classification, seasonal and yearly change detection and monitoring, and identification of changes in man-made features may use a clustering of sparse approximations (CoSA) on sparse representations in learned dictionaries. A Hebbian learning rule may be used to build multispectral or hyperspectral, multiresolution dictionaries that are adapted to regional satellite image data. Sparse image representations of pixel patches over the learned dictionaries may be used to perform unsupervised k-means clustering into land cover categories. The clustering process behaves as a classifier in detecting real variability. This approach may combine spectral and spatial textural characteristics to detect geologic, vegetative, hydrologic, and man-made features, as well as changes in these features over time.

12 Claims, 19 Drawing Sheets

(56) References Cited

U.S. PATENT DOCUMENTS

| | | | |
|---|---|---|---|
| 7,196,641 B2 | 3/2007 | Huang et al. | |
| 7,271,747 B2 | 9/2007 | Baraniuk et al. | |
| 7,970,209 B2 | 6/2011 | Yoon et al. | |
| 8,538,200 B2 | 9/2013 | Wang et al. | |
| 8,693,765 B2 | 4/2014 | Mercier et al. | |
| 9,311,531 B2 | 4/2016 | Amtrup et al. | |
| 9,313,072 B2 | 4/2016 | Katabi et al. | |
| 9,684,951 B2 | 6/2017 | Wohlberg | |
| 2010/0040296 A1* | 2/2010 | Ma | G06K 9/6218 382/225 |
| 2012/0065924 A1 | 3/2012 | Nielsen et al. | |
| 2013/0129207 A1* | 5/2013 | Liu | G06T 5/50 382/165 |
| 2014/0212055 A1* | 7/2014 | Boriah | G06F 17/30247 382/224 |
| 2015/0071528 A1* | 3/2015 | Marchisio | G06K 9/6269 382/159 |
| 2015/0154465 A1 | 6/2015 | Gueguen | |
| 2015/0170526 A1 | 6/2015 | Wang et al. | |
| 2015/0379431 A1* | 12/2015 | Stokes | G06T 17/05 706/11 |
| 2016/0026848 A1* | 1/2016 | Hamid | G06K 9/00637 382/103 |
| 2016/0093212 A1* | 3/2016 | Barfield, Jr. | H04N 7/185 348/144 |
| 2016/0171302 A1* | 6/2016 | Lavigne | G06K 9/00657 382/110 |
| 2016/0307073 A1* | 10/2016 | Moody | G06K 9/00536 |
| 2017/0075872 A1 | 3/2017 | Tong et al. | |
| 2017/0098122 A1 | 4/2017 | Kaliouby et al. | |
| 2017/0213109 A1* | 7/2017 | Moody | G06K 9/6267 |
| 2017/0284867 A1* | 10/2017 | Gensemer | G01J 3/18 |

OTHER PUBLICATIONS

Amir Alavi, "Non-Final Office Action", dated Jul. 13, 2017, U.S. Appl. No. 15/134,437.
A. D. Szlam et al., "Convolutional Matching Pursuit and Dictionary Training," CoRR, (Oct. 3, 2010).
A. M. Bruckstein et al., "From Sparse Solutions of Systems of Equations to Sparse Modeling of Signals and Images," SIAM Review, vol. 51, No. 1, pp. 34-81 (2009).
Alavi Amir, "Non-Final Office Action", dated Dec. 22, 2016 for U.S. Appl. No. 14/668,900.
Amir Alavi, "Restriction Requirement", dated Oct. 21, 2016 for U.S. Appl. No. 14/668,900.
B. A. Olshausen et al., "Learning Sparse Image Codes Using a Wavelet Pyramid Architecture," Adv. Neural Inf. Process. Syst., vol. 13, pp. 887-893 (2000).
B. Mailhe et al., "Dictionary Learning with Large Step Gradient Descent for Sparse Representations," Latent Variable Analysis and Signal Separation, ser. Lecture Notes in Computer Science, F. J. Theis et al., Eds. Springer Berlin Heidelberg, vol. 7191, pp. 231-238 (2012).
B. Ophir et al., "Multi-Scale Dictionary Learning Using Wavelets," IEEE J. Sel. Topics Signal Process., vol. 5, No. 5, pp. 1014-1024 (Sep. 2011).
B.S. He et al., "Alternating Direction Method with Self-Adaptive Penalty Parameters for Monotone Variational Inequalities," Journal of Optimization Theory and Applications, vol. 106, No. 2, pp. 337-356 (Aug. 2000).
C. Rusu et al., "Explicit Shift-Invariant Dictionary Learning," IEEE Signal Process. Lett., vol. 21, No. 1, pp. 6-9 (Jan. 2014).
H. Bristow et al., "Fast Convolutional Sparse Coding," Proceedings of the IEEE Conference on Computer Vision and Pattern Recognition (CVPR), pp. 391-398 (Jun. 2013).
J. Eckstein, "Augmented Lagrangian and Alternating Direction Methods for Convex Optimization: A Tutorial and some Illustrative Computational Results," Rutgers Center for Operations Research, Rutgers University, Rutcor Research Report RRR 32-2012, http://rutcor.rutgers.edu/pub/rrr/reports2012/32 2012.pdf (Dec. 2012).
J. Mairal et al., "Non-Local Sparse Models for Image Restoration," Proceedings of the IEEE International Conference on Computer Vision (CVPR), pp. 2272-2279 (2009).
J. Mairal et al., "Task-Driven Dictionary Learning," IEEE Transactions on Pattern Analysis and Machine Intelligence, vol. 34, No. 4, pp. 791-804 (Apr. 2012).
J. Yang et al., "Supervised Translation-Invariant Sparse Coding," Proceedings of the IEEE Conference on Computer Vision and Pattern Recognition (CVPR), pp. 3517-3524 (2010).
K. Engan et al., "Method of Optimal Directions for Frame Design," Proceedings of the IEEE International Conference on Acoustics, Speech, and Signal Processing (ICASSP), vol. 5, pp. 2443-2446 (1999).
K. Kavukcuoglu et al., "Learning Convolutional Feature Hierachies for Visual Recognition," Advances in Neural Information Processing Systems (NIPS) (2010).
K. Skretting et al., "General Design Algorithm for Sparse Frame Expansions," Signal Process., vol. 86, No. 1, pp. 117-126, (Jan. 2006).
K. Skretting et al., "Image Compression Using Learned Dictionaries by RLS-DLA and Compared with K-SVD," Proc. IEEE Int. Conf. Acoust. Speech Signal Process. (ICASSP), pp. 1517-1520 (May 2011).
M. D. Zeiler et al., "Adaptive Deconvolutional Networks for Mid and High Level Feature Learning," Proc. IEEE Int. Cont. Comp. Vis. (ICCV), pp. 2018-2025 (2011).
M. D. Zeiler et al., "Deconvolutional Networks," Proceedings of the IEEE Conference on Computer Vision and Pattern Recognition (CVPR), pp. 2528-2535 (Jun. 2010).
M. Pachitariu et al., "Extracting Regions of Interest from Biological Images with Convolutional Sparse Block Coding," Adv. Neural Inf. Process. Syst., vol. 26, pp. 1745-1753 (2013).
M. S. Lewicki et al., "Coding Time-Varying Signals Using Sparse, Shift-Invariant Representations," Adv. Neural Inf. Process. Syst., vol. 11, pp. 730-736 (1999).
M. V. Afonso et al., "Fast Image Recovery Using Variable Splitting and Constrained Optimization," IEEE Trans. Image Process., vol. 19, No. 9, pp. 2345-2356 (2010).
Manya V. Afonso et al., "An Augmented Lagrangian Approach to the Constrained Optimization Formulation of Imaging Inverse Problems," IEEE Transactions on Image Processing, vol. 20, No. 3 (Mar. 2011).
N. Egidi et al., "A Sherman-Morrison Approach to the Solution of Linear Systems," Journal of Computational and Applied Mathematics, vol. 189, No. 1-2, pp. 703-718 (May 2006).
R. Chalasani et al., "A Fast Proximal Method for Convolutional Sparse Coding," Proceedings of the International Joint conference on Neural Networks (IJCNN), pp. 1-5 (Aug. 2013).
R. Grosse et al., "Shift-Invariant Sparse Coding for Audio Classification," Proc. Twenty-Third Conf. on Uncertainty in Artificial Intell. (UAI), pp. 149-158 (Jul. 2007).
S. Boyd et al., "Distributed Optimization and Statistical Learning via the Alternating Direction Method of Multipliers," Foundations and Trends in Machine Learning, vol. 3, No. 1, pp. 1-122 (2010).
S. S. Chen et al., "Atomic Decomposition by Basis Pursuit," SIAM Journal on Scientific Computing, vol. 20, No. 1, pp. 33-61 (1998).
T. Blumensath et al., "On Shift-Invariant Sparse Coding," Independent Component Analysis and Blind Signal Separation, ser. Lecture Notes in Computer Science, vol. 3195, pp. 1205-1212 (2004).
T. Blumensath et al., "Shift-Invariant Sparse Coding for Single Channel Blind Source Separation," Signal Processing with Adaptative Sparse Structured Representations (SPARS) (Nov. 2005).
T. Blumensath et al., "Sparse and Shift-Invariant Representations of Music," IEEE Trans. Audio, Speech, Language Process., vol. 14, No. 1, pp. 50-57 (Jan. 2006).
T. Blumensath et al., "Unsupervised Learning of Sparse and Shift-Invariant Decompositions of Polyphonic Music," Proc. IEEE Int. Conf. Acoust. Speech Signal Process. (ICASSP), vol. 5, pp. 497-500 (May 2004).
W. W. Hager, "Updating the Inverse of a Matrix," SIAM Review, vol. 31, No. 2, pp. 221-239 (Jun. 1989).

(56) References Cited

OTHER PUBLICATIONS

Y. Boureau et al., "Learning Mid-Level Features for Recognition," Proceedings of the IEEE Conference on Computer Vision and Pattern Recognition (CVPR), pp. 2559-2566 (Jun. 2010).
Amir Alavi, "Notice of Allowance", dated Sep. 27, 2017, U.S. Appl. No. 15/134,437.

* cited by examiner

210

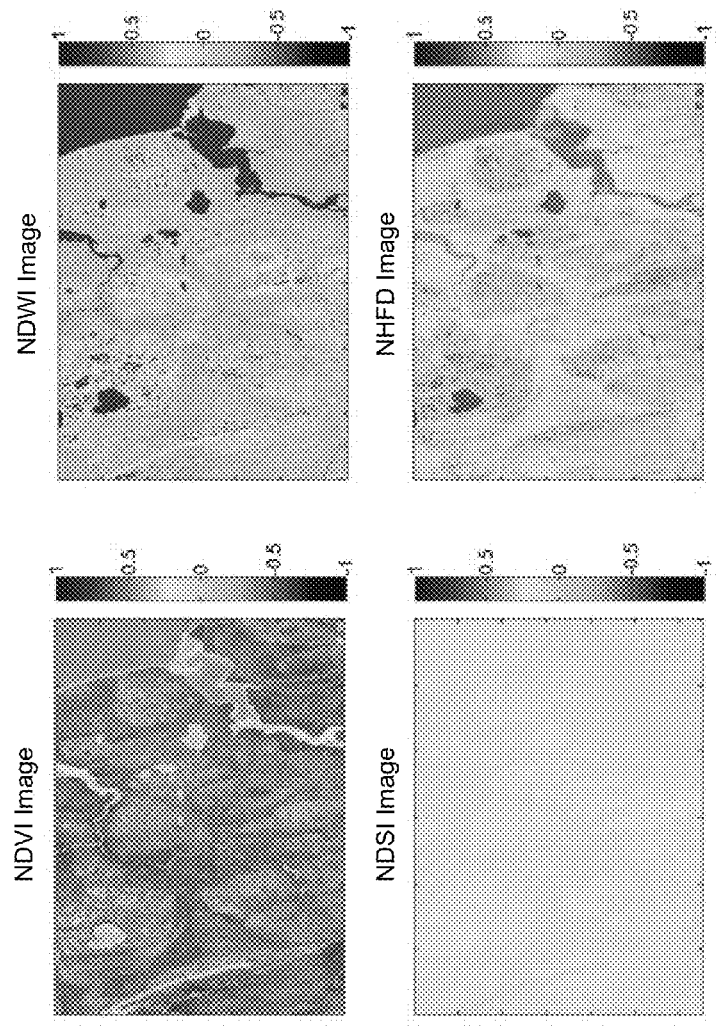

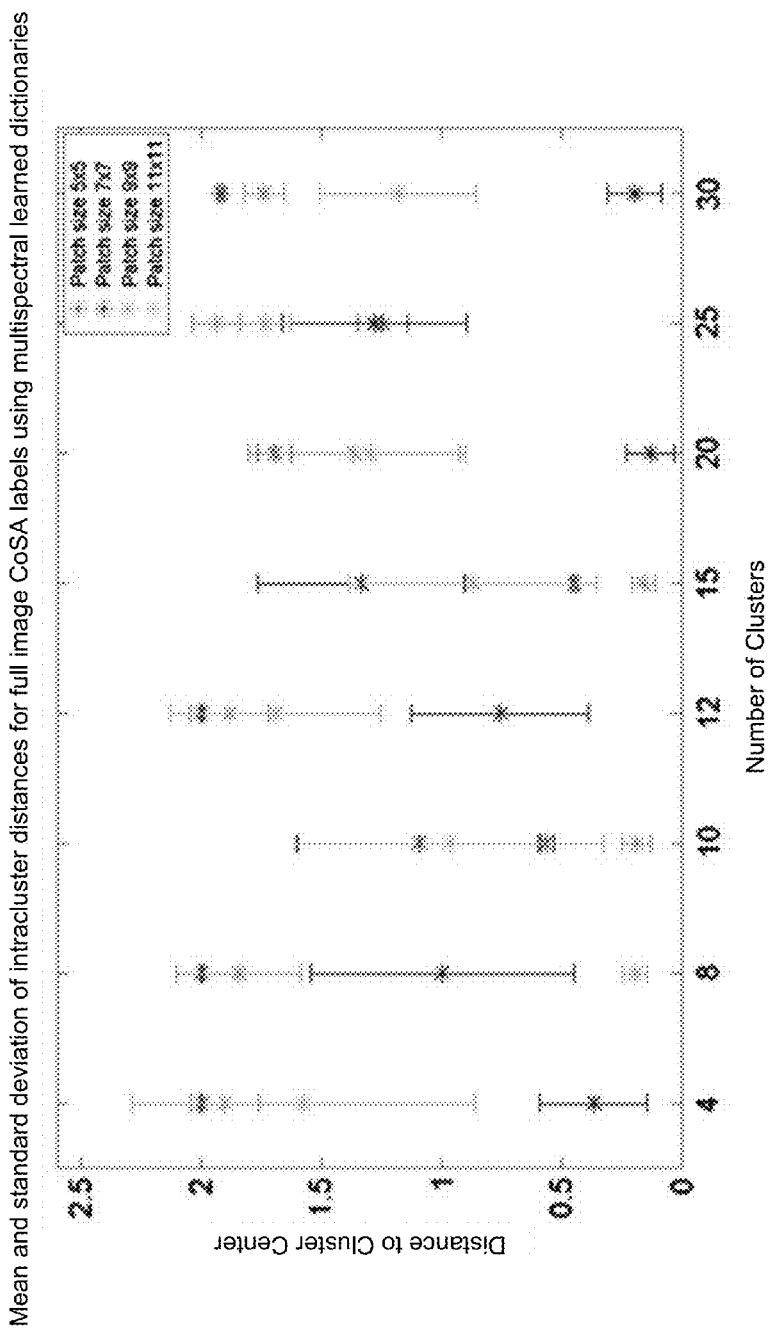

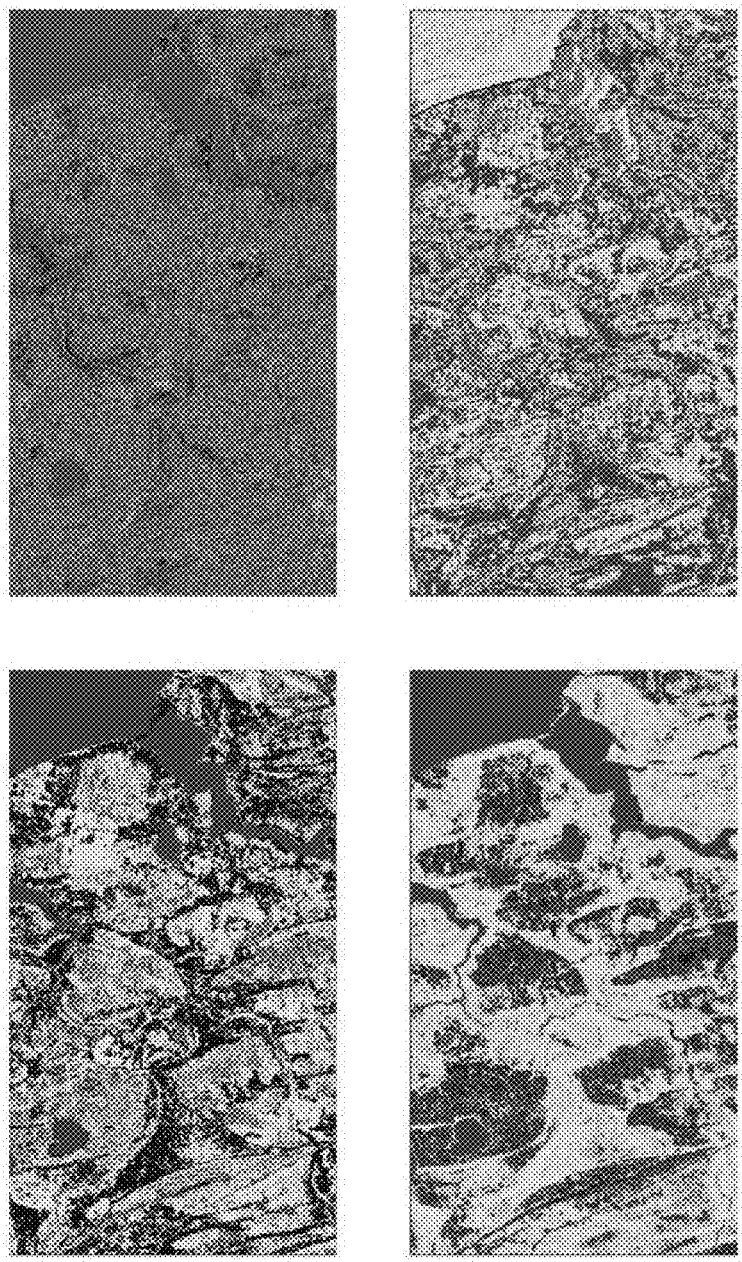

CHANGE DETECTION AND CHANGE MONITORING OF NATURAL AND MAN-MADE FEATURES IN MULTISPECTRAL AND HYPERSPECTRAL SATELLITE IMAGERY

CROSS REFERENCE TO RELATED APPLICATION

This application claims the benefit of U.S. provisional patent application No. 62/149,933 filed on Apr. 20, 2015. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to image analysis, and more specifically, to applying dictionary learning to high-resolution, multispectral or hyperspectral satellite imagery to determine features that are present in the imagery, as well as feature changes over time.

BACKGROUND

Neuroscience-inspired, neuromimetic machine vision and pattern recognition algorithms are of interest for applications related to climate change monitoring, change detection, and Land Use/Land Cover (LULC) classification using satellite image data. However, these approaches frequently are not robust for multiple classes that are spatially mixed. Furthermore, despite the vast archives of globally distributed remotely sensed data collected over the last four decades and the availability of computing resources to process these datasets, global assessment of all but the simplest landscape features is not currently possible. This limitation arises from the substantial human intervention needed to accurately train current state-of-the-art feature extraction software and the limited applicability of resulting feature extraction solutions to multiple images, both spatially and temporally. Without more robust and adaptive methods to identify and extract land surface features, Earth scientists lack critical datasets needed to parameterize models and quantify climatic and land use driven changes.

Land cover classification in satellite imagery presents a signal processing challenge, usually due to the lack of verified pixel-level ground truth information. A large number of proprietary and open source applications exist to process remote sensing data and generate land cover classification using, for example, normalized difference vegetative index (NDVI) information or unsupervised clustering of raw pixels. These techniques rely heavily on domain expertise and usually require human input.

Other land cover classification approaches involve the use of state-of-the-art genetic algorithms, such as GENIE™, to extract a particular class of interest in a supervised manner. GENIE™ and GeniePro™ are feature extraction tools developed at Los Alamos National Laboratory for multispectral, hyperspectral, panchromatic, and multi-instrument fused imagery, but they also require supervision in training.

One of the main limitations is the difficulty in providing clean training data, i.e., only pixels that truly belong to the class of interest. This is easier to do when the classes are well separated spatially from other classes, such as separating bodies of water from land or golf courses from buildings. However, this is much more difficult to do when the classes are spatially mixed (e.g., tundra shrubs and grasses) at a pixel or subpixel level.

Conventional techniques have been successful for lower-resolution satellite data, such as Landsat imagery, but they rely heavily on domain expertise and frequently require human input or supervision. These conventional techniques perform well on certain types of problems, such as distinguishing between water and land features (e.g., automatic lake detection), or specific vegetative analysis, but they are usually not robust for spatially mixed classes. The quality of spectral unmixing plays an important role in extracting information and features from low-resolution pixels, and historically, it has been a typical step in processing and classifying multispectral and hyperspectral data.

In the case of WorldView-2™ and WorldView-3™ multispectral imagery, however, spectral unmixing is less of a problem due to the much enhanced pixel resolution. The challenge instead lies in context-based information extraction using spatial and spectral texture generated by adjacent pixels. The textural patterns in a given image also need to be learned based on the wider-area context provided by the full image scene, usually necessitating significant computational resources and creative software optimization. Many current users of multispectral WorldView-2™ data resort to downsampling the image to equivalent Landsat resolution in order to facilitate feature extraction using available commercial applications.

A fundamental problem to creating scalable feature extraction technology capable of processing imagery datasets at global scales is the overconstrained training needed to generate effective solutions. Many features of environmental importance including, but not limited to, rivers, water bodies, coastlines, glaciers, and vegetation boundaries, are readily recognizable to humans based on a simple set of attributes. The very best of current feature extraction software, e.g., LANL-developed GeniePro™ however, requires extensive, image-specific training that leads to a solution with limited applicability to images other than the image used for training. Accordingly, developing automatic, unsupervised feature extraction and high-resolution, pixel-level classification tools may be beneficial and have a significant impact for a number of application areas, e.g., for studying climate change effects and providing the climate change community with more exact ways of detecting yearly and seasonal changes.

SUMMARY

Certain embodiments of the present invention may provide solutions to the problems and needs in the art that have not yet been fully identified, appreciated, or solved by conventional image analysis technologies. For example, some embodiments of the present invention pertain to a classifier that performs unsupervised classification of land cover in multispectral or hyperspectral satellite imagery using clustering of sparse approximations (CoSA) on sparse representations in learned dictionaries. A Hebbian learning rule may be used to build multispectral or hyperspectral, multiresolution dictionaries that are adapted to regional satellite image data. Sparse image representations of pixel patches over the learned dictionaries may be used to perform unsupervised k-means clustering into land cover categories. This approach may combine spectral and spatial textural characteristics to detect geologic, vegetative, and hydrologic features. Furthermore, man-made features may be detected and monitored, such as progress in construction of a building.

In an embodiment, a computer-implemented method includes learning representative land features, by a computing system, from multi-band patches or pixels of image data to form a learned feature dictionary. The multi-band patches may be raw spectral bands or bands derived as normalized band difference indices in some embodiments. The resulting learned feature dictionary is referred to as a multispectral or hyperspectral learned dictionary in the former case, and an index learned dictionary in the latter case. The band difference indices that can be computed depend on the available spectral bands of the sensor. Some indices that can be considered include, but are not limited to, normalized difference vegetative index (NDVI), normalized difference wetness index (NDWI), normalized difference soil index (NDSI), and/or non-homogeneous feature distance (NHFD). These example indices are provided by way of example only and other indices may also be used without deviating from the scope of the invention.

The method also includes applying representative features from the learned feature dictionary, by the computing system, to image patches or pixels from an image in a sparse fashion to form a sparse representation. The computer-implemented method further includes clustering the sparse representation of the features in the image, by the computing system, into land cover categories. Additionally, the computer-implemented method includes performing land cover classification and change detection in this sparse domain, by the computing system, after the image is clustered and outputting results.

In another embodiment, a computer program is embodied on a non-transitory computer-readable medium. The computer program is configured to cause at least one processor to cluster features in a first image of an area taken at a first time and cluster features in a second image of the area taken at a second time. The second time is after the first time. The computer program is also configured to cause the at least one processor to calculate a relative change in pixel labels and cluster size between clusters from the first image and clusters from the second image. The computer program is further configured to cause the at least one processor to output results of the calculation of the relative change in the pixel labels and/or the cluster size.

In yet another embodiment, an apparatus includes memory storing computer program instructions and at least one processor configured to execute the stored computer program instructions. The at least one processor, by executing the stored computer program instructions, is configured to cluster features in a first image of an area taken at a first time and cluster features in a second image of the area taken at a second time. The second time is after the first time. The at least one processor is also configured to calculate an area change between clusters from the first image and clusters from the second image. The at least one processor is further configured to output results of the calculation.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3A illustrates four normalized difference index images for the Barrow control region displayed using the same color scheme for the Jul. 21, 2010 image.

FIG. 5A is a graph illustrating mean intracluster distances for the multispectral dictionaries for all four spatial resolutions for the Jul. 21, 2010, data, according to an embodiment of the present invention.

FIG. 6B illustrates images showing the clustering results at 5×5, 7×7, 9×9, and 11×11 patch size resolutions for the Aug. 4, 2010, image, according to an embodiment of the present invention.

DETAILED DESCRIPTION OF THE EMBODIMENTS

Figure 1A:
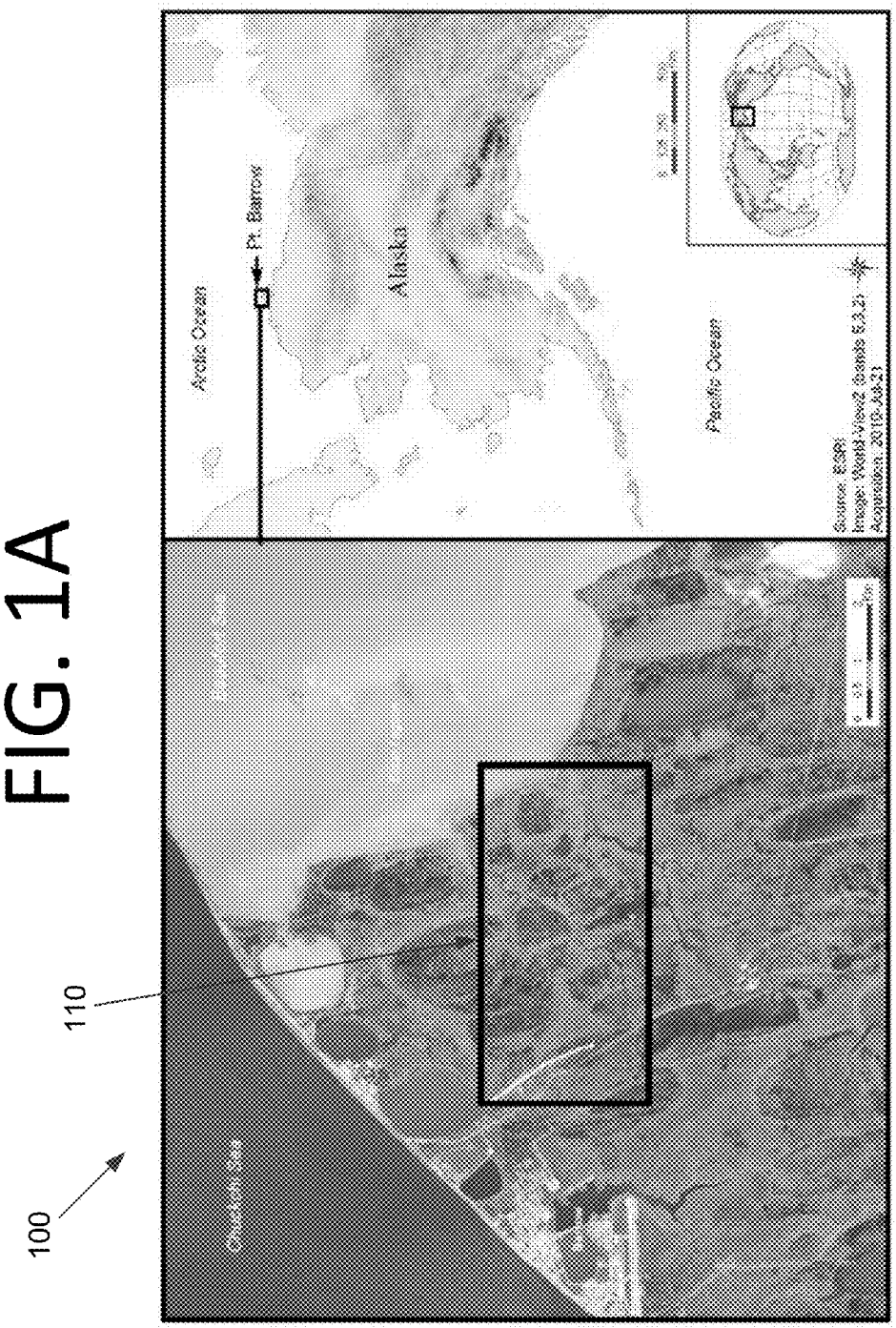
FIG. 1A is a map and a WorldView-2™ satellite image acquired on Jul. 21, 2010, illustrating the geographic location and features of Barrow, Ak. with a traditional (5,3,2) band combination.

Some embodiments of the present invention pertain to a classifier that performs unsupervised classification of land cover in multispectral or hyperspectral satellite imagery using sparse representations in learned dictionaries. This approach is called Clustering on Sparse Approximations (CoSA) herein. "Multispectral" imagery typically includes between 3-12 bands that are represented in pixels. "Hyperspectral" imagery typically consists of far more, narrower bands (usually 10-20 nm). For instance, a hyperspectral image may have hundreds or thousands of bands. However, use of any number and size of bands is contemplated without deviating from the scope of the invention.

Dictionary learning algorithms extend the idea of dictionaries adapted to data by learning the dictionary elements directly from the data itself, without an underlying analytical data model. Several algorithms have been explored for learning overcomplete dictionaries for image representation and classification. In some embodiments, a modified Hebbian learning rule was used to build spectral-textural dictionaries that are adapted to the data, and the method was demonstrated using DigitalGlobe WorldView-2™ visible/near infrared high spatial resolution imagery.

Using undercomplete learned dictionaries provides dimensionality reduction, which is desirable in high data rate applications. Sparse image representations of pixel patches over the learned dictionaries are used to perform unsupervised k-means clustering into land cover classes. Four different spatial resolutions are explored herein and the impact thereof on clustering performance is shown. CoSA combines spectral and spatial textural characteristics to detect geologic, vegetative, and hydrologic features in some embodiments. Our results suggest that neuroscience-based models are a promising approach to practical pattern recognition problems in remote sensing, even for datasets using spectral bands not found in natural visual systems.

Arctic Study Site

DigitalGlobe's WorldView-2™ satellite imagery is among the highest resolution commercially available multispectral data at less than 2 meter spatial resolution. The WorldView-2™ sensor provides eight multispectral bands: four standard bands (red, green, blue, and near-infrared 1) and four new bands (coastal blue, yellow, red-edge, and near-infrared 2). This high spatial resolution leads to imagery characterized by very rich spatial and spectral textures and a lower degree of spectral mixing compared to Landsat™ data, for example. However, the richness of the data can also pose problems for traditional land cover classification approaches developed for lower resolution imagery. By way of example, one Arctic region was selected herein (Barrow, Ak.) to illustrate the CoSA method for unsupervised land cover classification and for detecting and tracking seasonal changes according to an embodiment.

Global climate models suggest that the Arctic will continue to warm more rapidly than southerly locations, drawing significant attention to this region among climatologists. The thawing of the permafrost can be indirectly studied using surface changes in vegetative cover or associated geomorphic features, such as polygonal ground. Across much of the Arctic, the number of lakes and their sizes have also been changing as a result of permafrost degradation. Such surface changes, which can occur over varying timescales (days to months), are now more readily visible in the high resolution imagery given by Woldview-2™. As such, development of automatic feature extraction and high-resolution, pixel-level classification tools can have a significant impact in monitoring these changes. The signal processing challenge arises partly from to the lack of verified pixel-level ground truth information in such relatively unpopulated areas, and partly from the high volume of data currently available.

Barrow, Ak.

Located within the Alaskan Arctic Coastal Plain, on the coast of the Chukchi Sea, the village of Barrow is the northernmost community in the United States, located around 71.2956° N, 156.7664° W. See the map and satellite images 100, 110 of FIGS. 1A and 1B, respectively. The nearby area includes the study site for the Department of Energy's Next Generation Ecosystem Experiments (NGEE-Arctic) project. The long term goal is developing an ecosystem model that integrates various observables, including vegetative changes, land-surfaces characteristics, surface water dynamics, and subsurface processes causing possible release of soil organic carbon, among others.

Figure 1B:
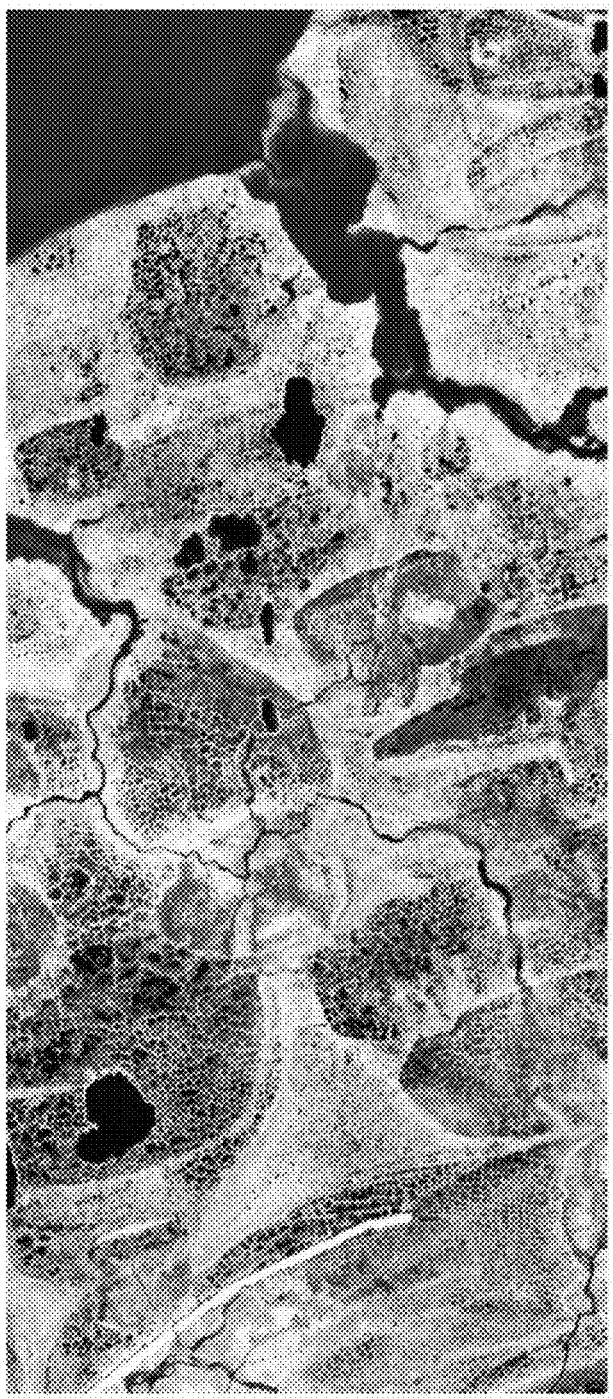
FIG. 1B is an expanded satellite image of the control region defined by the rectangle in the satellite image of FIG. 1A with an (8,6,4) band combination.

Orthorectified image 100 in FIG. 1A was acquired during the Arctic summer, on Jul. 21, 2010, and shows the greater Barrow area, with a spatial extent of approximately 12.2 km×14.4 km (530 megapixels multispectral). Here, a traditional (5,3,2) band combination is shown (i.e., red, green, and blue—RGB). The colors are not visible here since the image has been converted to grayscale. This highlights the degree of water turbidity, due largely to suspended sediment, in the lakes and rivers, as well as the rich geomorphic texture present in the Barrow area. For ease of visualization, the focus is on control region 110 delineated by the black rectangle in FIG. 1A and shown in more detail in FIG. 1B. Control region 110 has an approximate spatial extent of 1.9 km×5.4 km. In FIG. 1B, an (8,6,4) band combination (i.e., near-infrared 2, red edge, and yellow) is shown, which serves to highlight vegetative areas (yellows). This control image will be subsequently used herein both for dictionary learning and for cluster training.

Control region 110 is selected to include the features of interest present in full satellite image 100 of FIG. 1A, and exhibits a large degree of spatial heterogeneity (i.e., there is a large degree of mixture between land cover classes). Control region 110 includes a mosaic of thaw lakes, drained thaw lake basins, and interstitial polygons, both high centered and low centered (i.e., low moisture and high moisture soils). Polygonal ground is a geomorphic feature common in permafrost regions and is the object of much study in the Barrow region. Such frozen soil can be dry or can contain ice, which is usually found in large wedges forming a honeycomb of ice walls beneath the soil surface. Polygonal tundra landscapes are highly heterogeneous, varying substantially over spatial scales of only a few meters. Thus, this terrain presents a significant challenge for developing the vegetation maps needed to scale plot-level measurements to wide-area coverage maps landscape with conventional approaches.

Vegetative gradients exist both within a single polygon type and between polygon types with differing degrees of ice-wedge degradation. Plant communities are linked to polygon-induced microtopography and include sedges, mixed tall graminoid-forb-moss communities, graminoid-lichen communities, and low-stature, lichen dominated communities. Leaf area index for the region is higher in trough communities (averaging between 0.7 and 1.1 $m^2/m^2$) and decreases from wetter to drier areas along the moisture gradient (averaging between 0.1 and 0.5 $m^2/m^2$).

Figure 2A:
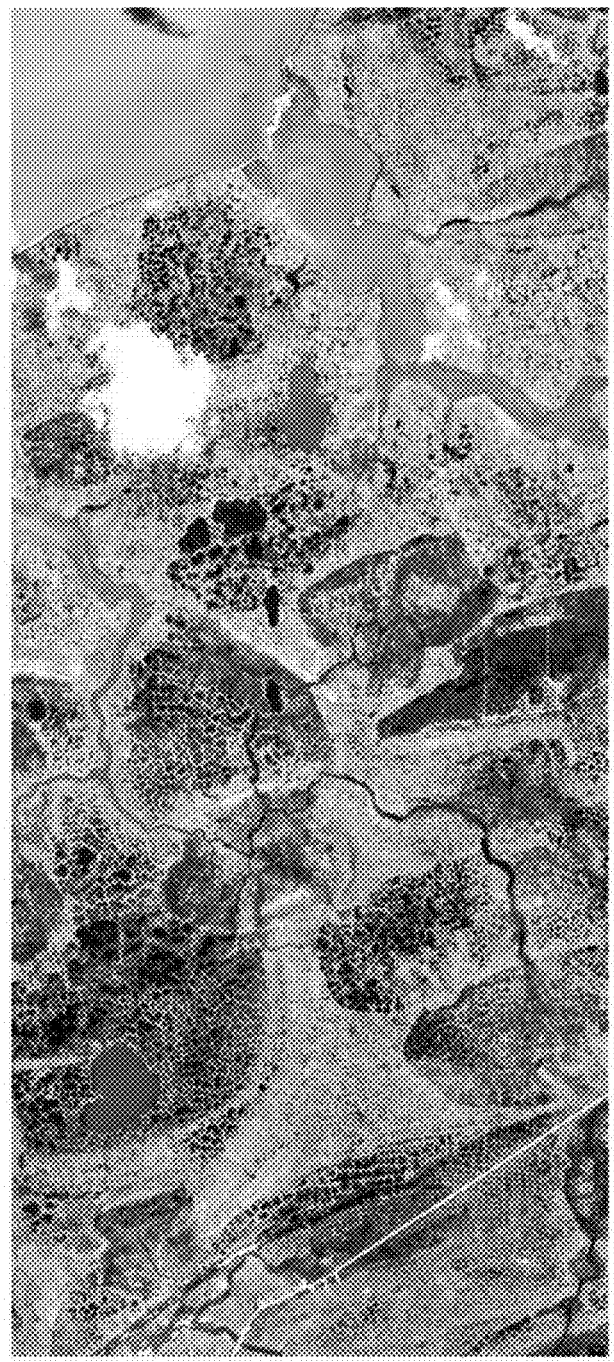
FIG. 2A is an expanded WorldView-2™ satellite image of the control region defined by the rectangle in the satellite image of FIG. 1A with a traditional (5,3,2) band combination, but acquired two weeks later, on Aug. 4, 2010.

Since this example focuses on using an embodiment of CoSA to track seasonal changes in land cover, two images are used to demonstrate its effectiveness. Control region 110 in FIG. 1B is used as a reference image and compared to control region 200 in FIG. 2A, shown in the RGB band combination, acquired just two weeks later, on Aug. 4, 2010. Control region 210 of FIG. 2B shows the Aug. 4, 2010, image, but this time in an (8,6,4) band combination.

From an information content point of view, the Barrow images have a high degree of heterogeneity and geomorphic structure, with many sharp boundaries (high gradients with almost random orientations), and many gradual transition areas (e.g., water with sediment, mixed vegetation, and moist soils). This presents an information extraction challenge since many potentially competing factors should be considered in designing land cover classification algorithms. An interesting observation is that despite the variability in image texture, gradients, and interpretation, an analyst has little difficulty separating meaningful features. This may be a good indication that neuromimetic approaches like CoSA can be successful at extracting the relevant features as well.

Figure 2B:
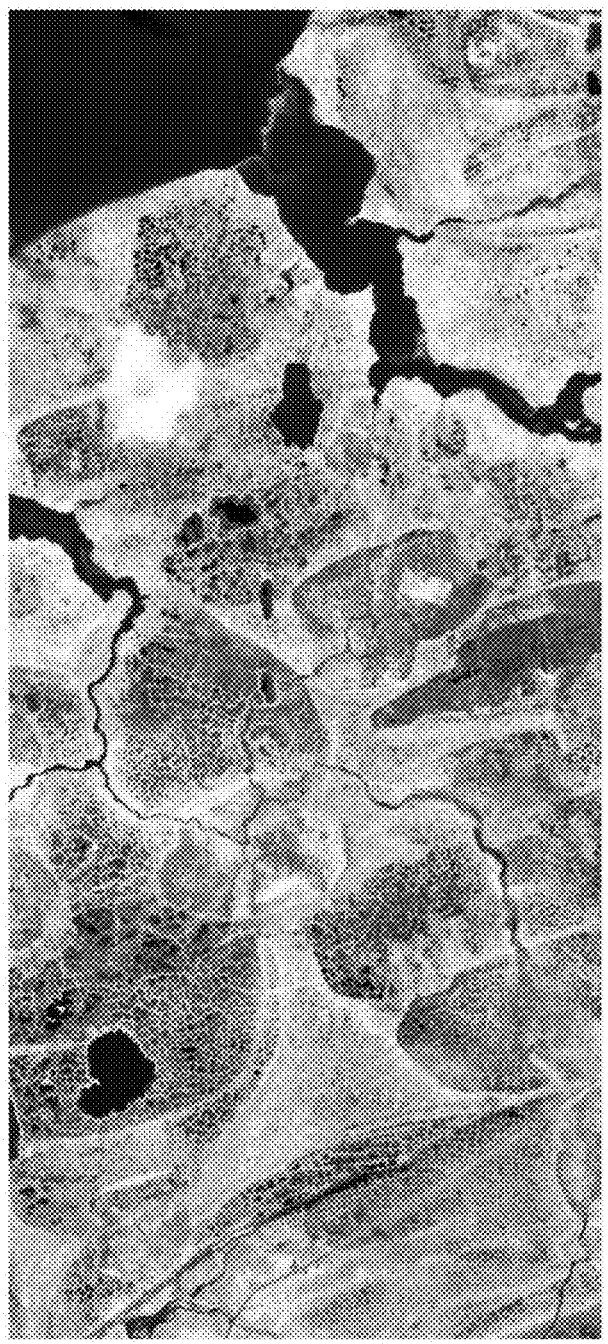
FIG. 2B is an expanded satellite image of the control region defined by the rectangle in the satellite image of FIG. 1A with an (8,6,4) band combination, but acquired two weeks later, on Aug. 4, 2010.

Both images in FIGS. 2A and 2B are orthorectified and georeferenced, but neither has undergone radiometric normalization or atmospheric correction beyond the WorldView-2™ standard product preprocessing. There are illumination changes, as well as some occlusions in FIGS. 2A and 2B due to cloud cover. It should be noted that the opacity of the cloud varies within each band, and its edges appear more transparent in FIG. 2B as compared to FIG. 2A. An important aspect of the CoSA dictionary learning process in some embodiments is appropriately normalizing the training data and the dictionary elements. Given that such normalization is built into the algorithm in this embodiment, initial radiometric normalization was not performed on the Aug. 4, 2010, image, and it is expected to be accounted for in the sparse approximation process.

Current Land Cover Mapping Results

Several state-of-the-art tools were used on this data in an attempt to achieve meaningful multiclass discrimination and for comparison with the CoSA approach of some embodiments, such as one of the most widely used remote-sensing software packages, the ENvironment for Visualizing Imagery (ENVI), distributed by Exelis Visual Information Solutions™ of Boulder, Colo. Some CoSA land cover classification results for the July Barrow control image were shown using features learned both from multispectral data and normalized band difference data. The focus herein is on normalized band difference analysis, described below, which provided the most separable classification labels according to a self-defined metric, and at a reduced computational cost.

Normalized Band Difference Training Data

One approach used by environmental experts to estimate land cover labels involves manipulating spectral bands into index images, and then assigning binned index values to field-derived categories. A normalized band difference ratio is typically derived to measure absorption in a portion of the spectrum relative to reflectance or radiance in another part of the spectrum. Herein, four normalized band difference index ratios are considered. All eight spectral bands provided by this sensor are uniquely used in one such index ratio in order to provide some context of possible use with respect to traditional index analysis techniques.

The normalized difference vegetation index (NDVI) uses a red and near-infrared 1 (NIR1) band combination. It is the most well-known band difference index and is used to detect live green plant canopies and their condition in multispectral remote sensing data. The NDVI is directly related to the photosynthetic capacity and energy absorption of plant canopies, and areas containing dense vegetation will tend to positive NDVI values (e.g., 0.3 to 0.8). By contrast, features such as clouds and snow tend to be rather bright in the red band (as well as other visible wavelengths) and quite dark in the NIR band, leading to negative NDVI values. Other targets, such as water bodies or soils, will both generate small positive NDVI values, or in the former case, sometimes slightly negative NDVI values. Thus, they are not separable with confidence using NDVI. Domain expert input is typically required to properly decide the binning of NDVI coefficients.

The normalized difference wetness index (NDWI) is moisture sensitive and can use a blue band that is normalized against an NIR band. For the moisture-rich Barrow data case, the coastal blue band and the NIR2 band were used, since this band combination offers the greatest dynamic range in the NDWI. For the normalized difference soil index (NDSI), short-wave infrared (SWIR) and NIR bands are normally used to capture the difference in reflectance values in soil areas. Since WorldView-2™ data does not include a SWIR band, the differences in the response values of soil between the green and yellow bands may be used.

The nonhomogeneous feature distance (NHFD) band ratio was generated using the new red edge band normalized with respect to the blue band, i.e., the two WorldView-2™ bands remaining to be used in the analysis. This choice is slightly different from use of the red edge and coastal blue bands for the NHFD index in another approach, and was motivated by the desire to use all eight bands in a unique band ratio combination. NHFD's intended use is to help identify areas of contrast against the background, in particular, man-made features.

A secondary motivation to including each of the eight bands in a unique band ratio combination was reducing the computational cost and potentially increasing the discriminative information in the data used to train the dictionaries of features. Table 1 below summarizes these four indices and their corresponding band ratio.

TABLE 1

INDICES AND CORRESPONDING BAND RATIOS

| Index: | Band Ratio: | Purpose: |
| --- | --- | --- |
| NDVI | $\sum \frac{NIR1 - Red}{Red + NIR1}$ | Identify vegetated areas and determine the health of each vegetation class. |
| NDWI | $\sum \frac{Coastal - NIR2}{Coastal + NIR2}$ | Identify standing water areas and determine moisture content of vegetation and soil. |
| NDSI | $\sum \frac{Green - Yellow}{Green + Yellow}$ | Identify areas where soils are the dominant material. |

TABLE 1-continued

INDICES AND CORRESPONDING BAND RATIOS

| Index: | Band Ratio: | Purpose: |
|---|---|---|
| NHFD | $\sum \frac{RedEdge - Blue}{RedEdge + Blue}$ | Identify areas of contrast against the background. |

Figure 3B:
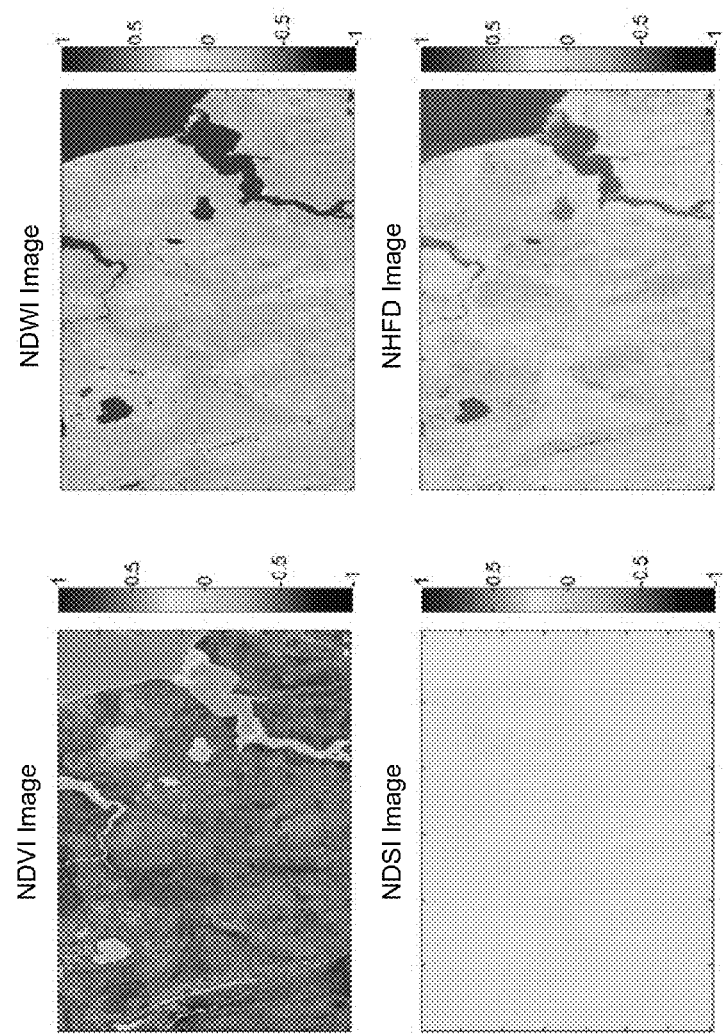
FIG. 3B illustrates four normalized difference index images for the Barrow control region displayed using the same color scheme for the Aug. 4, 2010 image.

FIGS. 3A and 3B show normalized difference index images 300, 310 for the Jul. 21, 2010, and Aug. 4, 2010, images, respectively. Each index is within the ±1 range by design, and all images are displayed using the same color scheme and same color axis. As expected for the Barrow area, the NDVI and NDWI (top panels) capture most of the dynamic range (e.g., moisture is a dominant feature), and the NHFD (bottom right) provides only moderate separation between dry and moist areas. The NDSI (bottom left) as defined here offers little separation between the different geomorphic features. In other words, the NDSI brings little discriminative information given its small dynamic range, and could potentially be used for dimensionality reduction.

Dictionary Learning for Multispectral or Hyperspectral Data

A domain expert manually derives land cover classification by taking into account both spectral information (e.g., normalized difference indices), as well as spatial texture (i.e., context given by adjacent pixels). For high resolution satellite imagery, such as WorldView-2™ data, small scale discriminative information is carried by both spectral and spatial texture, i.e., adjacent pixel context. This was often not the case for lower resolution images, such as Landsat™ data (at 30 meters/pixel), where the spatial context carries significantly less weight compared to the spectral information at small scales (i.e., objects with sizes less than 30 meters). In other words, the spatial context is frequently embedded in a single pixel, leading to challenging pixel unmixing problems.

A Hebbian algorithm was used in some embodiments to learn representative land features directly from multi-band patches of satellite image data. These representative features were then used to approximate every image patch in a sparse fashion (i.e., with very few decomposition terms). Land cover classification and change detection were performed in this sparse domain once the entire image was transformed via the learned dictionary.

The dictionaries were learned in some embodiments from millions of overlapping image patches and then a pursuit search was used to generate sparse classification features. These sparse representations of pixel patches were used to perform unsupervised k-means clustering into land cover categories.

Dictionary Learning Algorithm

The learned dictionary algorithm used in CoSA in an embodiment is summarized below. Given a training set of image patches, each reshaped as a 1-D vector, a dictionary is initialized by imprinting (i.e., seeding the dictionary elements with randomly drawn training patches). The dictionary may also be initialized in some embodiments with random unit-norm vectors or a sparsifying transform of the image patches. The imprinting initialization example is provided by way of example only and other initialization methods may also be used without deviating from the scope of the invention. The dictionary is learned using a batch Hebbian algorithm, which minimizes a cost function E for sparse representation of an input vector $x_i$, given by:

$$E = \min_a \|x - \Phi a\|_2^2 + \lambda S(a), \ S(a) = \left(\sum_i |a_i|^p\right)^{1/p} \quad (1)$$

E measures the mean-square reconstruction error, while $S(\cdot)$ is a sparsity-inducing constraint on the coefficient vector $a_i$—in this case, the $l_0$ "norm." This is a two-step minimization process, and an approximate solution for the sparse coefficient vector is obtained via a greedy matching pursuit algorithm. In other words, given the current dictionary $\Phi$, an L-sparse weight vector $a_i$ is sought for each training vector $x_i$, such that $\Phi a_i$ is a sufficiently good approximation of the input, $$\min_{a_i}\{\|x_i - \Phi a_i\|_2^2\}, \text{ subject to } \|a_i\|_0 \leq L \quad (2)$$

The dictionary update for every dictionary element is obtained by performing gradient descent on the cost function E for a small batch of training vectors I, resulting in:

$$\Delta \varphi_k = \frac{1}{I} \sum_i \eta a_{ik}(x_i - \Phi a_i) \quad (3)$$

where $\eta$ controls the learning rate, and the updated dictionary element is normalized to unit norm. The dictionary learning continues until convergence is achieved for all dictionary elements, that is, until individual dictionary elements stop changing significantly between consecutive updates.

Multi-Band, Multiresolution Learned Dictionaries

Tens of millions of overlapping multi-band pixel patches were randomly extracted from the entire image and used to learn undercomplete or overcomplete dictionaries with an online batch Hebbian algorithm. In terms of input dimensionality, the satellite imagery was processed using square multispectral pixel patches of p×p×B pixels, where p defines the spatial resolution of the patch and B is the number of bands used for learning. p may be as small as 1 (i.e., single pixel resolution), and as large as the pixel span of features of interest in some embodiments. A pixel patch is reshaped as a 1-D vector of overall length N, where N is the ambient input dimensionality. Four different spatial resolutions of 5×5, 7×7, 9×9, and 11×11 pixel patches were used in this embodiment to learn distinct dictionaries. However, any desired spatial resolution may be used as a matter of design choice depending on the image resolution and application.

Given the 1.82 m pixel resolution of WorldView-2™ imagery, the chosen patch sizes map to physical square areas of approximate length 9.1 m, 12.8 m, 16.5 m, and 20.2 m, respectively, for multispectral, 8-band dictionaries. These spatial resolutions result in ambient dimensionalities of N=200, 392, 648, and 968 vector length, respectively. The learned dictionaries were chosen to have a constant size of K=300 elements at each of the four spatial resolutions, making them overcomplete by a factor of 1.5 in the first case and undercomplete by a factor of 0.8, 0.5, and 0.3, respectively, in the latter three cases. The dictionary size is provided by way of example only and other embodiments may use a varying number of learned dictionary elements without deviating from the scope of the invention.

Figure 4A:
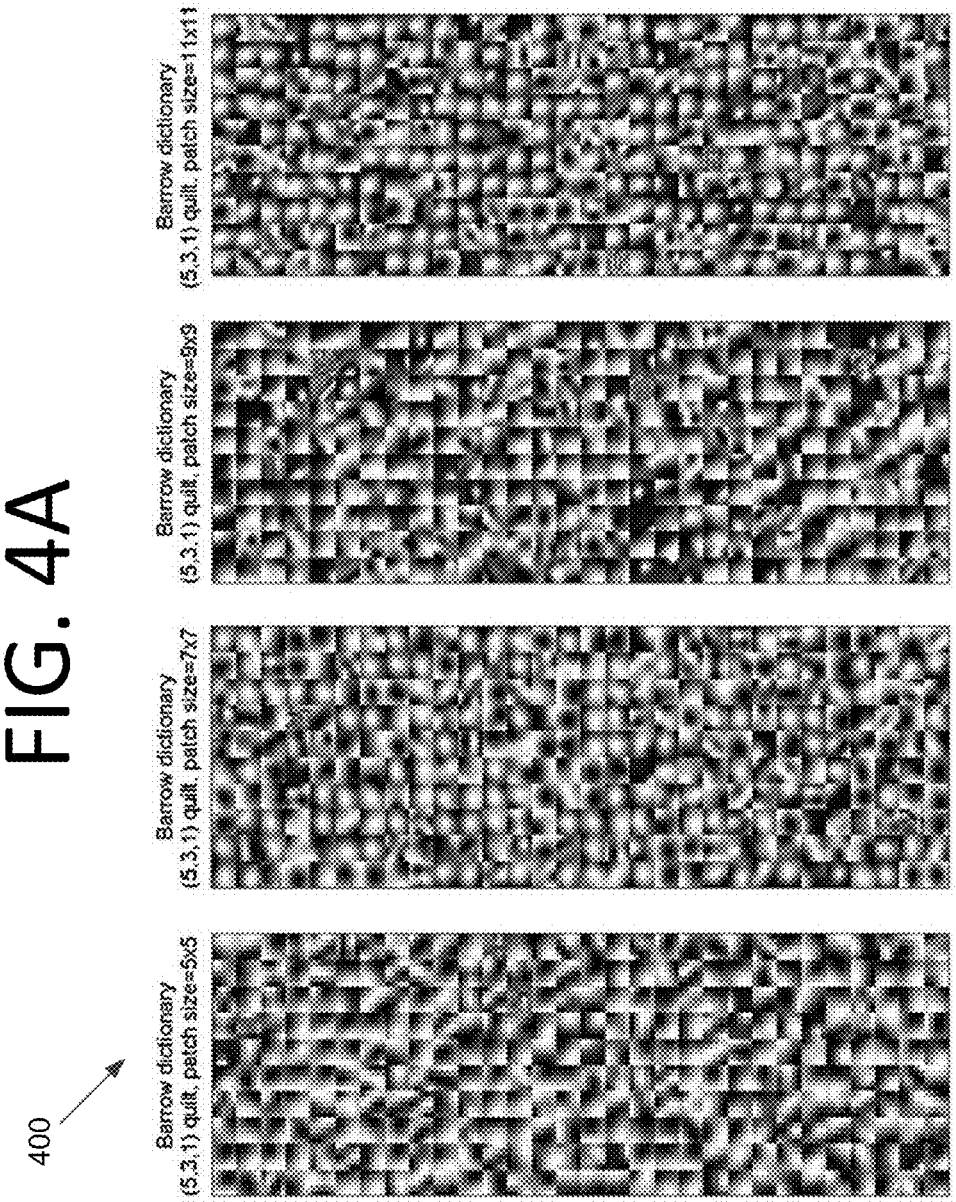
FIG. 4A shows quilts of the multispectral learned dictionaries for each of the four patch sizes for a (5,3,1) band combination, according to an embodiment of the present invention.
Figure 4B:
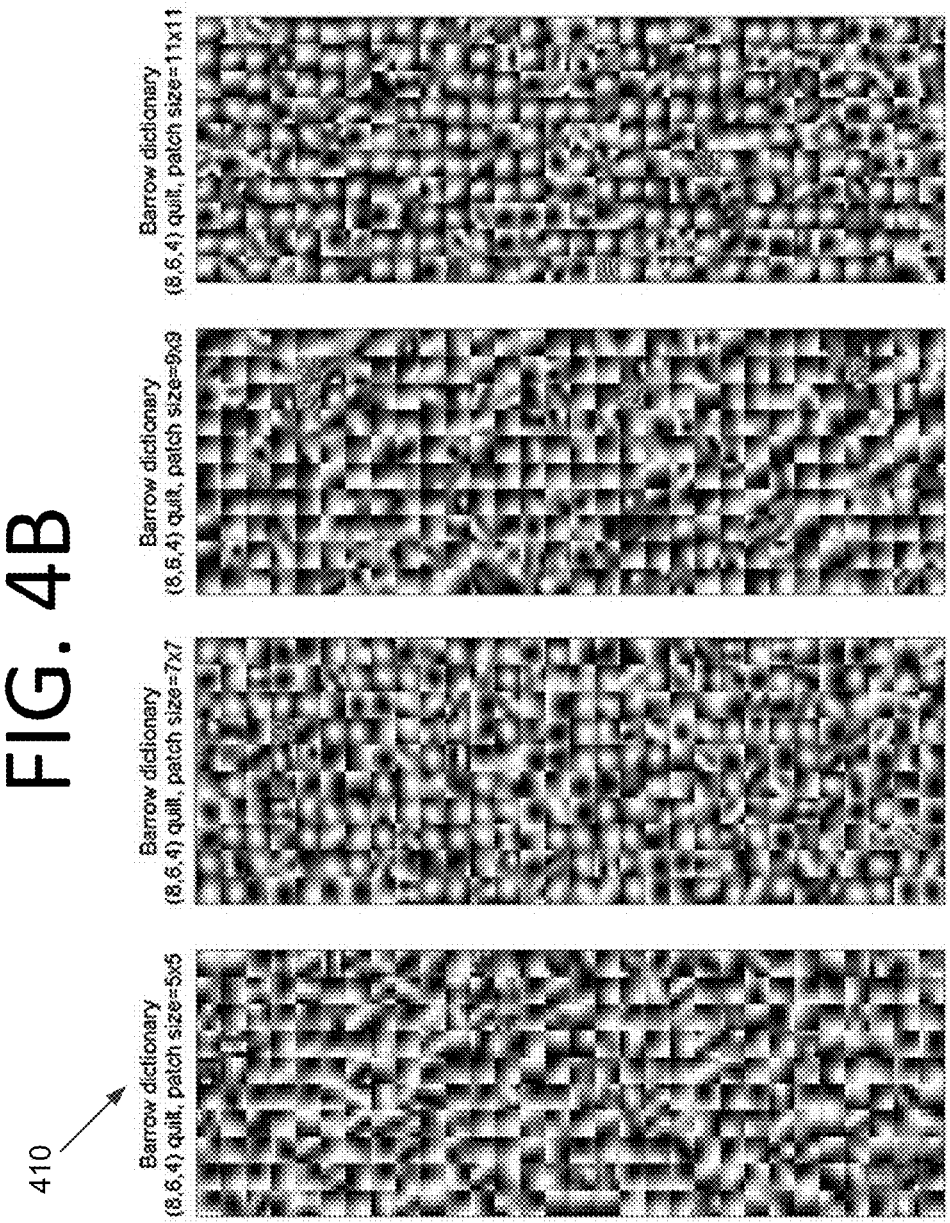
FIG. 4B shows quilts of the multispectral learned dictionaries for each of the four patch sizes for a (8,6,4) band combination, according to an embodiment of the present invention.

Dictionary quilts were used to visualize the spatial texture learned by the dictionary elements. Dictionary quilts are obtained by stacking images of all the dictionary elements in matrix form. Every dictionary element of length N is reshaped in the p×p×B format, and an image of the element is then formed using the desired three-band combination. The quilts are a qualitative view of the dictionaries and provide insight into what type of land features are learned by each element. FIG. 4A shows quilts 400 of the multispectral learned dictionaries for each of the four patch sizes for a (5,3,1) band combination. Similarly, FIG. 4B shows quilts 410 of the same example multispectral learned dictionaries for each of the four patch sizes, but for an (8,6,4) band combination to highlight vegetative features.

Each dictionary element is shown in the same position on the respective quilt for the two band combinations. Upon visual inspection, almost all the elements exhibit texture (i.e., variability in pixel intensity), and many contain oriented edges. Some of the elements that appear more uniform or more muted in one band combination exhibit more texture or intensity in the other band combination. This indicates that dictionary elements are sensitive to both spatial and spectral information. The Barrow dictionaries have features with sharp boundaries, i.e., high contrasts between two adjacent smooth features. This is consistent with the larger degree of geomorphic texture present in the Barrow image.

Index Learned Dictionaries: Spatial Texture

The four normalized difference index images derived from the Jul. 21, 2010, image were used as the training data for the index learned dictionaries. Specifically, the 8 original WorldView-2™ bands were replaced with the 4 corresponding index bands: NDVI, NDWI, NDSI, and NHFD. The data dimensionality was thus reduced by a factor of 2, which is helpful in reducing computational overhead. Additionally, as seen in FIGS. 3A and 3B, the type of discriminative features contained in the index bands can potentially steer the learning by increasing separation in the training data between moisture content and vegetation (NDVI and NDWI), and diminishing the impact of soils (NDSI).

Figure 4C:
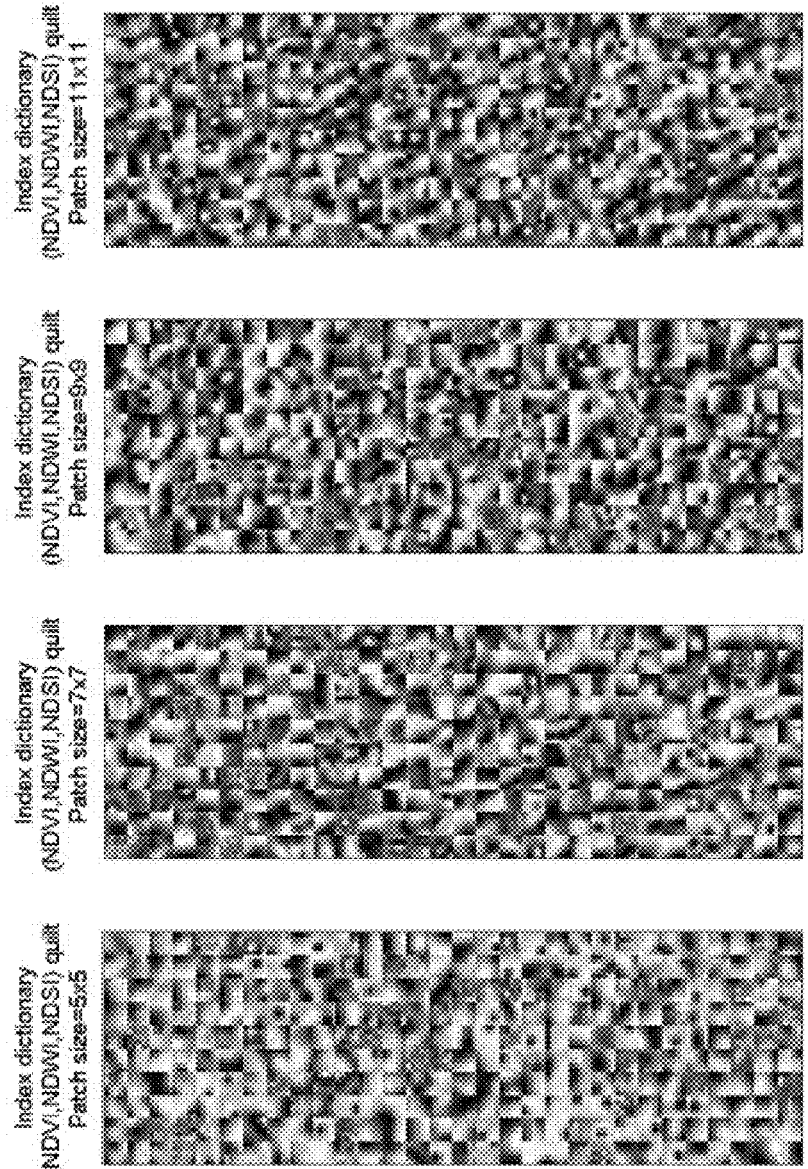
FIG. 4C illustrates quilts of the index learned dictionaries for each of the four spatial resolutions shown in an equivalent (NDVI, NDWI, NDSI) band combination, according to an embodiment of the present invention.

To visualize the spatial texture learned by the dictionary elements via quilts, every dictionary element of length N was be reshaped in the p×p×4 format and shown as an equivalent RGB image using a 3-band combination—in this case (NDVI, NDWI, NDSI). Dictionary quilts may then be obtained by stacking the images of all the elements in matrix form. FIG. 4C shows quilts 420 of learned dictionary elements for each of the four spatial resolutions. Each small square in a quilt represents a dictionary element. The quilts are a qualitative view of the dictionaries and provide insight into what type of land features are learned by each element. Upon visual inspection, almost all the elements exhibit texture (i.e., variability in pixel intensity), and many contain accomplish this, a k-means clustering algorithm may be used on the undercomplete, sparse approximations of multispectral or hyperspectral image patches (i.e., feature vectors) that were found using the learned dictionaries. Some embodiments include data transformations that would enable more class separability, e.g., band difference indices. Also, the inclusion of LiDAR data and LiDAR derived indices in the dictionary learning process, for example, is possible in some embodiments. This may provide joint dictionary feature learning for wide area unsupervised classification and/or change detection and monitoring.

Since two types of learned dictionaries were used that were extracted from multispectral and index band data, a large number of clustering scenarios should be considered. An important step is determining the number of clusters necessary for good classification from a domain expert point of view. A range of a fixed number of cluster centers, $\{4, 8, 10, 12, 15, 20, 25,$ and $30\}$, is considered herein for each of the four spatial resolutions. A few million multispectral patches were randomly drawn from the training area and used to learn the cluster centers. The trained cluster centers were used to generate land cover labels at the same spatial pixel resolution of the original satellite image. Specifically, for every pixel in the image, a clustering classification label was given based on its surrounding context (i.e., pixel patch centered on the respective pixel). In other words, a step-size of 1 pixel was used to extract overlapping patches for classification and image borders were not extended. Each central pixel in a patch was therefore be assigned a classification level based on both its surrounding context and its spectral properties. One way to assess the quality of the full image land cover labels generated by CoSA is to quantify the resulting Euclidian intracluster distances when the entire image has been clustered.

In an ideal case, performance in classification of land cover would be best optimized and/or evaluated based on domain expert verified pixel-level ground truth. The amount of such training and validation data would have to be relatively large considering the dimensionality of the satellite imagery, the complexity of the terrain, and the parameter space of the CoSA algorithm, e.g., of the order of thousands up to tens of thousands of pixels at the equivalent WorldView-2™ resolution. This may present an opportunity for field ecologists to generate such verified ground truth data. Meanwhile, in the absence of pixel-level ground truth, one way to assess the quality of the full image land cover labels generated by CoSA is to quantify their resulting intracluster distances.

Table 2 provides average intracluster distances for CoSA labels using both types of learned dictionaries for the example case of 7×7 pixel spatial resolution and the range of cluster centers considered.

| | Number of Cluster Centers: | | | | | | | |
|---|---|---|---|---|---|---|---|---|
| Dict. Type: | 4 | 8 | 10 | 12 | 15 | 20 | 25 | 30 |
| MS | 0.365 ± 0.224 | 0.995 ± 0.547 | 1.090 ± 0.507 | 0.753 ± 0.369 | 1.330 ± 0.431 | 0.127 ± 0.099 | 1.279 ± 0.383 | 0.194 ± 0.112 |
| Index | 1.733 ± 0.262 | 0.392 ± 0.210 | 0.361 ± 0.169 | 0.406 ± 0.150 | 1.870 ± 0.219 | 0.272 ± 0.153 | 1.379 ± 0.369 | 1.732 ± 0.182 | oriented edges. Beyond those observations, the features contained in the index dictionaries are complex and difficult to interpret visually.

CoSA: Clustering of Sparse Approximations

The CoSA algorithm seeks to automatically identify land cover categories in an unsupervised fashion. In order to The mean and standard deviation of the intracluster distances after full image clustering are indicative of the degree of fit between the derived cluster centers and the true distribution of data, and so both small mean intracluster distance and small standard deviation are desirable within the cluster. At the selected pixel patch size in Table 2, both dictionary types lead to minimum mean intracluster distances at 20 cluster centers (bold values in Table 2). The associated standard deviation is minimum in the multispectral dictionary case and the second smallest in the index dictionary case.

Each particular clustering case was trained with multiple initializations of the k centers using a subset of the data, and the intracluster distances were then rechecked on a distinct test set. All cluster centers in this case are equal to the learned dictionary size in length (i.e., 300-length or 150-length) and very sparse. The clustering performance was qualitatively and quantitatively evaluated.

Figure 5B:
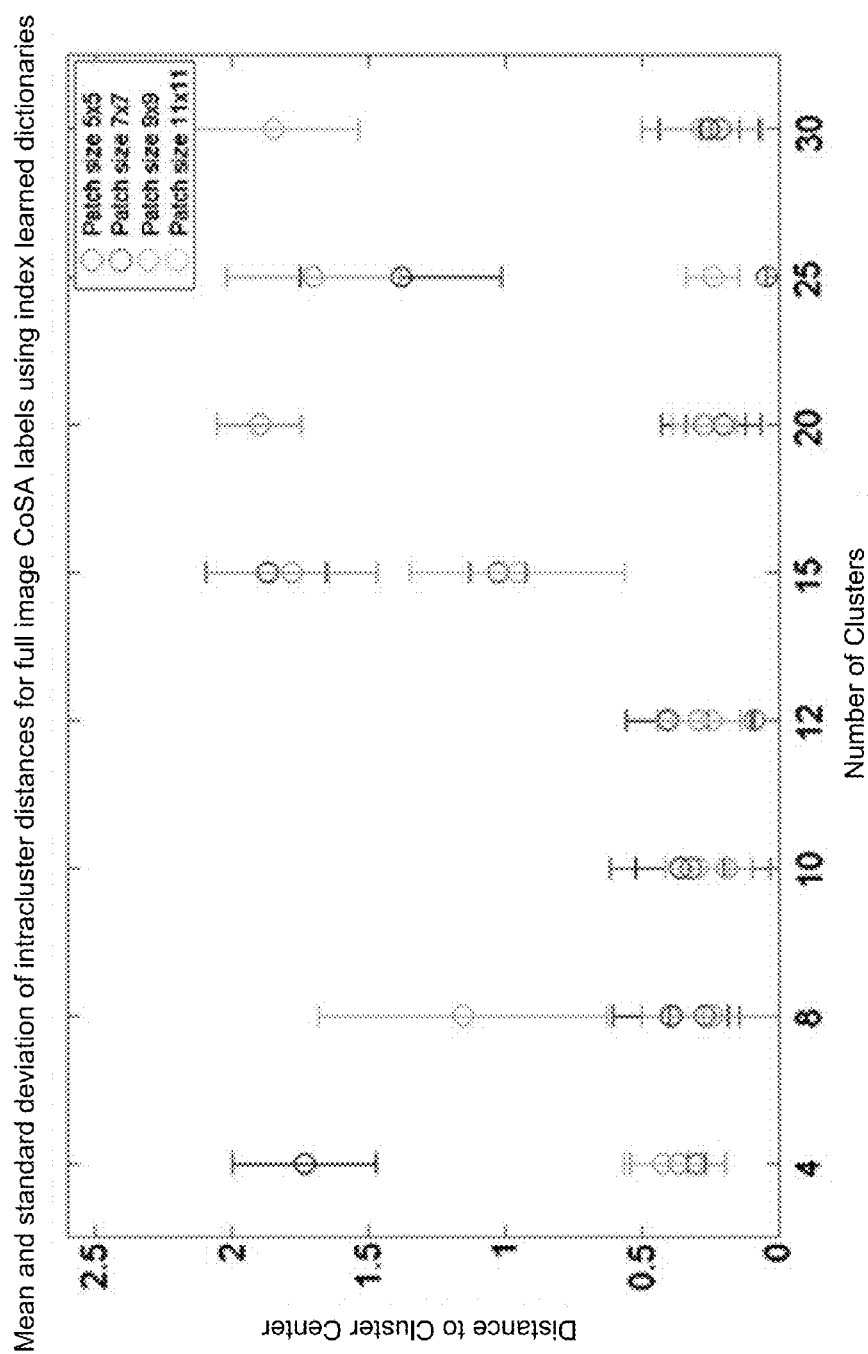
FIG. 5B is a graph illustrating mean intracluster distances for the index dictionaries for all four spatial resolutions for the Jul. 21, 2010, data, according to an embodiment of the present invention.

Graph 500 of FIG. 5A summarizes the mean intracluster distances for all four spatial resolutions for multispectral learned dictionaries. Similarly, graph 510 of FIG. 5B shows intracluster distance error bar plots for index learned dictionaries. Since these Euclidian distances were calculated in the sparse domain approximation using learned dictionaries, they are likely better indicators of meaningful clustering (i.e., matching actual land cover clusters) compared to direct measurement of distances in pixel intensity.

Graph 500 of FIG. 5A shows a wide range of clustering performance for approximations derived with dictionaries learned from raw multispectral data. For each spatial resolution, the corresponding minimum intracluster distance is reached with different numbers of cluster centers, and the standard deviations follow inconsistent patterns. A number of factors likely contribute to this effect, such as the spatial heterogeneity of the landscape, patch size, dictionary learning algorithm and convergence, and the k-means clustering convergence.

While it is very difficult to quantitatively evaluate how each factor impacts performance, graph 500 suggests that some form of data regularization may be beneficial. Assuming that transformation of the original eight-band image into four derived band difference indices achieves some degree of desired regularization, graph 510 of FIG. 5B shows improved and more consistent cluster label quality from a mathematical intracluster distance point of view. With few exceptions, mean and standard deviation of intracluster distances remain consistently small for a range of patch sizes and various number of cluster centers. It may be speculated that the few instances of higher intracluster distance are likely due to the local optimums chosen by the k-means algorithm. A different clustering algorithm, such as expectation maximization or a contiguous k-means, may lead to more consistent performance. The choice of clustering algorithm is not meant to be limiting of the scope of the present invention.

Based on FIGS. 5A and 5B, it appears that the case of 20 clusters leads to the tightest clusters (i.e., small mean distance to cluster center), and the most well distributed cluster sizes (i.e., small standard deviation in distance to cluster center), for 3 out of 4 patch sizes for both images (i.e., larger mean intracluster distance for the 9×9 case). This case is analyzed across the four different resolutions and used to demonstrate the application of CoSA for change detection. The final selection of the appropriate number of clusters for each image and at every resolution may be based on analysis of CoSA results by an environmental domain expert, where the primary criterion is whether the clustering gives meaningful separation of actual land cover.

Land Cover Classification

The initial performance assessment of the CoSA algorithm was subjective in nature and helped guide the research efforts towards parameters leading to meaningful clustering. The CoSA labels obtained using 20 clusters were qualitatively evaluated and visualized as images. Since each pixel was individually labeled based on its surrounding context pixels, the resulting label image had the same size/resolution as the original satellite image, except for the border pixels, and this was georeferenced for analysis.

The final selection of the appropriate number of clusters for each image and at every resolution is based on analysis of CoSA results by an environmental domain expert. The expectation is that CoSA would segment the image into categories that preserve the features and structures visible in the WorldView-2™ imagery, and do so better than unsupervised classification on raw pixels. The focus here is on analysis with 20 cluster centers (rectangular markups in FIGS. 5A and 5B) and an exploration of the corresponding full image CoSA labels.

Figure 6A:
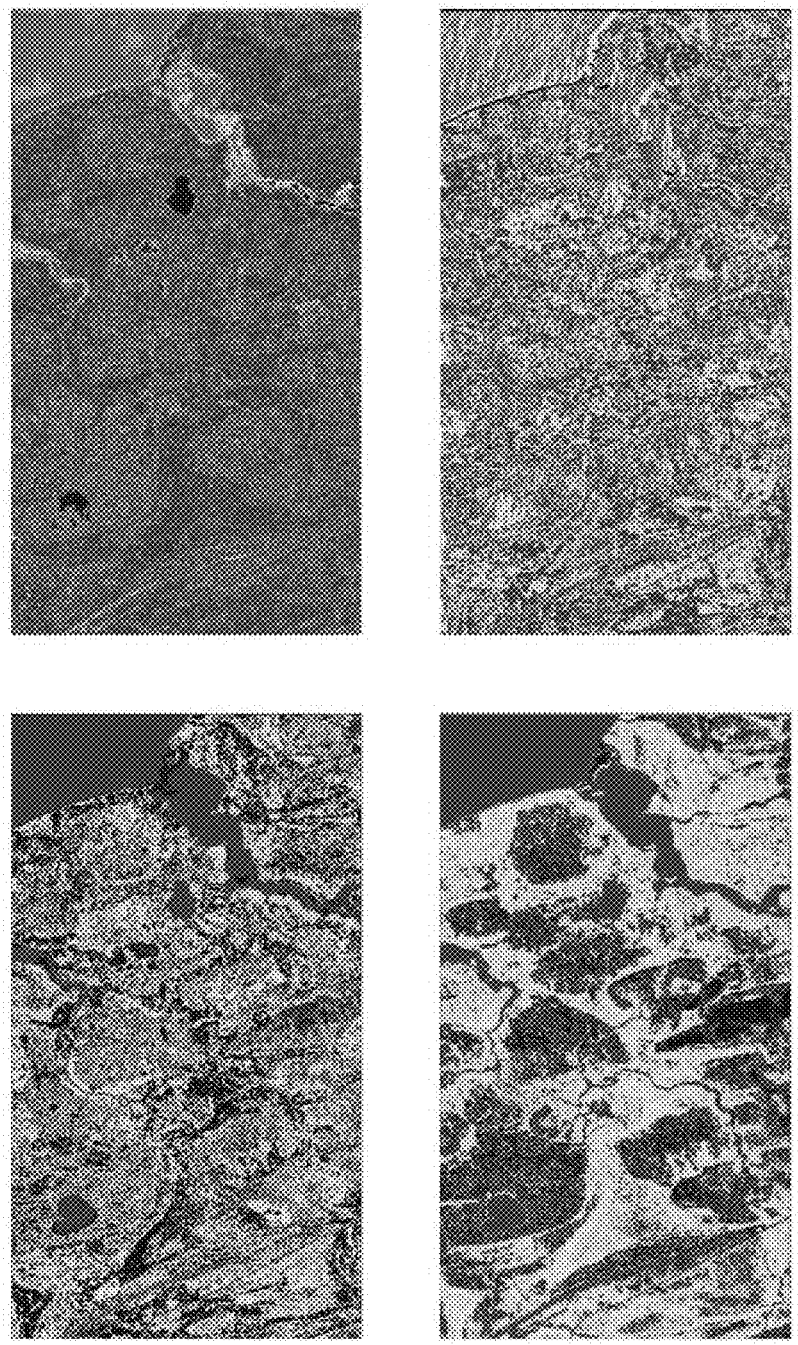
FIG. 6A illustrates images showing the clustering results at 5×5, 7×7, 9×9, and 11×11 patch size resolutions for the Jul. 21, 2010, image, according to an embodiment of the present invention.

Images 600 of FIG. 6A show the clustering results at 5×5, 7×7, 9×9, and 11×11 patch size resolutions for the Jul. 21, 2010, image, according to an embodiment of the present invention. Similarly, images 610 of FIG. 6B show the equivalent results for the Aug. 4, 2010, image. The label images are displayed using an arbitrary 20-color colormap, where each of the 20 colors corresponds to a particular cluster label. Since the cluster centers are identical for a given resolution, the colors for the CoSA labels also stay identical at that resolution and can be easily compared visually. Across the four resolutions, the cluster centers are obviously distinct, and the label to color association is arbitrary.

As expected from FIGS. 5A and 5B, the case of 9×9 resolution (top right panels of FIGS. 6A and 6B) leads to less meaningful clusters, and a considerable amount of label texture is observed. In the case of the Jul. 21, 2010 image, the labels appear to capture predominantly moisture-based features. However, that observation does not hold as strongly for the Aug. 4, 2010, image. The 11×11 patch size case (bottom right panels of FIGS. 6A and 6B) appears slightly better at capturing actual land features, but a large number of edge effects are observed, likely indicating that the patch size is too large for the Barrow type of image given its high degree of heterogeneity and geomorphic structure.

The CoSA labels for the 5×5 and 7×7 pixel resolution appear the most visually compelling when viewed next to actual satellite images of both Jul. 21, 2010, and Aug. 4, 2010, suggesting that smaller patches sizes are indeed needed for Barrow-like imagery. In order to obtain meaningful interpretation of the labels, a subject matter expert should correlate the labels to field-derived mappings of land cover for each resolution.

For the 7×7 pixel patch size (bottom left panels of FIGS. 6A and 6B), CoSA results in abundant texture in both soil moisture and soil topology (hydrologic and geomorphic features), as well as in vegetative features. The clusters also appear to retain transitional information in moist areas, which, if proven valid, could be useful for tracking inundation and/or hydrological changes in the area. The bright red labels (cluster number 18, grayscale here) correspond to deep water, and also capture the snow bank on the left side of the Jul. 21, 2010, image. The maroon labels (cluster numbers 19 and 20, grayscale here) and the blue labels (cluster numbers 1-5, grayscale here) appear to capture areas of shallow water with varying degree of turbidity or underwater vegetation, as well as soils with varying degrees of moisture saturation. Cyans, yellows and greens (cluster numbers 9-12, grayscale here) correspond to bare soils, grass areas and shrub vegetation.

It is interesting to note how CoSA performs in the area of cloud occlusion in the Aug. 4, 2010, image. Since the pixel labels are given based on surrounding context, and given that the cloud has different degrees of transparencies with the various spectral bands (compare FIGS. 2A and 2B), it appears that the sparse approximation approach is able to diminish the effects of the cloud at its edges, commensurate with the size of the pixel patch used in the analysis. This is a potential case of label inpainting (i.e., inferring the correct label based on surrounding context and learned feature knowledge) at the edges of the cloud.

Separability of Classes Metric

A quantitative and meaningful metric for clustering can be derived based on intrinsic data properties, specifically by assessing how individual clusters capture normalized difference index information. For each pixel in a given cluster, the values corresponding to its four normalized difference band indices may be extracted. Effectively, each cluster resulting from CoSA can now be represented in this four-dimensional space defined by (NDVI, NDWI, NDSI, NHFD). The three dominant indices, NDVI, NDWI, and NHFD, may be chosen to visualize the clusters. This is a novel metric, or more specifically, a novel metric domain for Euclidian distance, which may provide a more intuitive approach, to evaluating class separability using a more natural data interpretation compared to actual pixel intensity.

Figure 7:
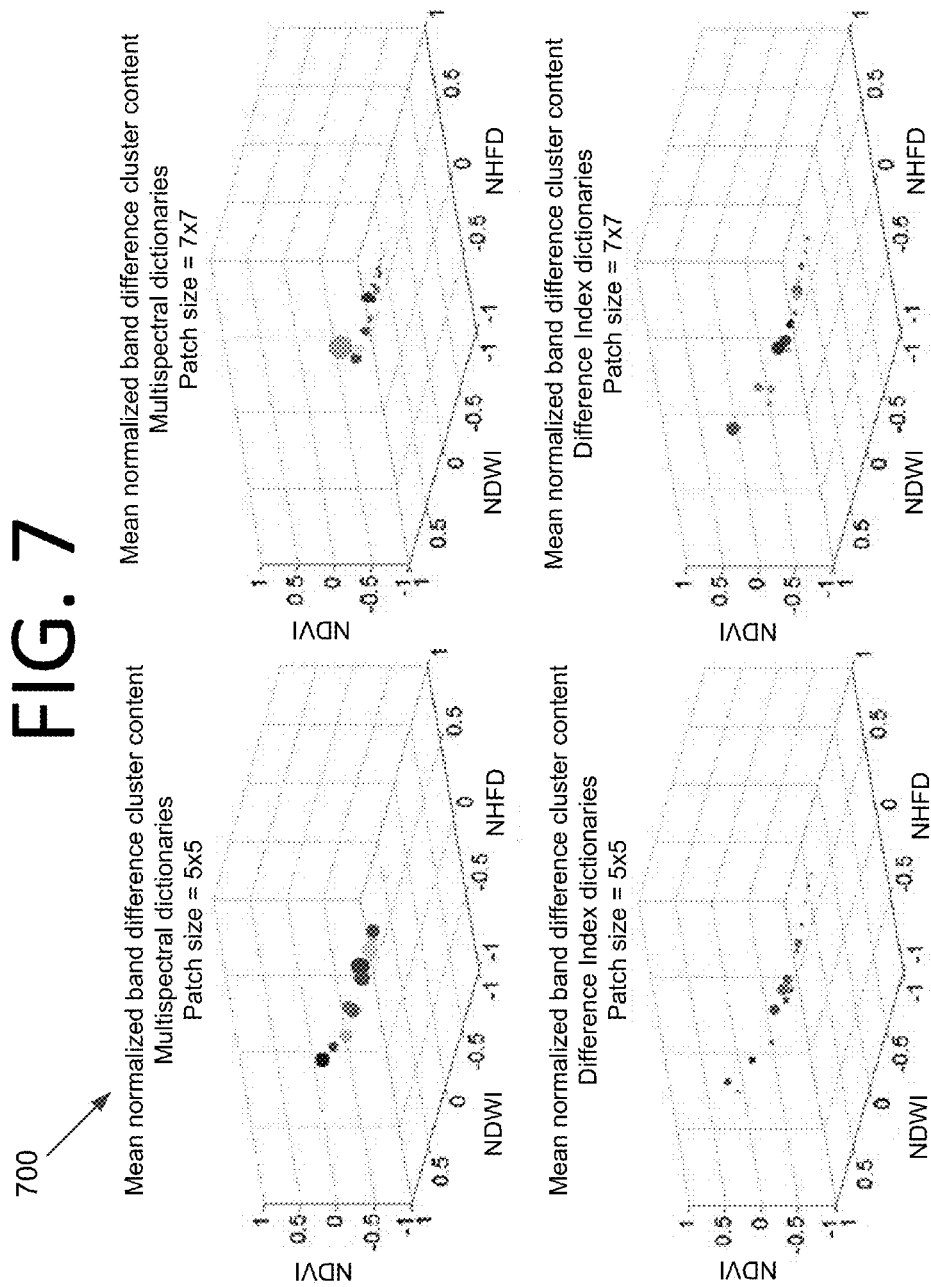
FIG. 7 illustrates cluster content scatter plots for 20 cluster centers at two spatial resolutions, 5×5 (left) and 7×7 (right), based on the associated CoSA performance for multispectral learned dictionaries (top panels) and index learned dictionaries (bottom panels), according to an embodiment of the present invention.

FIG. 7 shows cluster content scatter plots 700 for 20 cluster centers at two spatial resolutions, 5×5 (left) and 7×7 (right), based on the associated CoSA performance. The case of dictionaries learned from multispectral data (top) and index data (bottom) is again considered. Each sphere in scatter plots 700 of FIG. 7 represents one cluster, plotted at coordinates given by the respective mean difference index values and of diameter proportional to the intracluster mean variance across the three indices. Clusters are more separated (i.e., better class separation) and have more uniform variance distribution in the case of dictionaries learned from difference index bands compared to dictionaries learned from multispectral data. In the case of the 7×7 pixel patch size, FIG. 7 captures the performance improvement between the two dictionary types much stronger than the error bar plots of FIGS. 5A and 5B, which did not show drastic performance change at this resolution in the 20 cluster case.

FIG. 7 suggests that a more natural metric for estimating cluster convergence may be one based on normalized band difference information, rather than Euclidian or cosine angle distance on raw pixel data. The Barrow data provides some useful insight into how landscape heterogeneity impacts the learning and clustering processes. FIGS. 6A and 6B illustrate how different landscape features are predominantly learned and classified at each dictionary spatial resolution, and how preprocessing band data prior to learning can help reduce label texture. This implies that the CoSA technique can be a viable multiscale/multiresolution analysis tool for both multispectral and hyperspectral satellite data. At the same time, this wide range of possible CoSA label outcomes makes it difficult to apply directly to new data without a human in the loop. "Multiresolution" is defined herein as including more than one resolution, such as two or more of 1×1, 3×3, 5×5, 7×7, 9×9, or any combination of resolutions.

The exact purpose of the domain expert and the available sensor spatial resolution should inform the algorithm choices. For example, wide-area vegetative cover studies might require a larger pixel patch size, while geomorphic studies of polygonal ground might require a smaller patch size. Any potential edge effects introduced by using patch sizes that are too large should also be accounted for. Also, information extraction from a satellite image is in a broad sense highly dependent on the native pixel resolution, and additional issues, such as spectral unmixing, should be addressed for lower-resolution images, e.g., Landsat™ data. A challenge, therefore, to making the CoSA method successful for classification in remote sensing lies in understanding how to precondition the learning toward features of interest.

Change Detection Using CoSA

Since the CoSA labels are pixel-level and georeferenced, they could be used to track pixel-level change at the resolution of the original satellite imagery for any small area of interest (e.g., map vegetation inside a particular polygon). For the Barrow area, however, there is considerable interest in tracking wide area moisture and vegetation transitions in order to assess possible climate change impacts. Accordingly, it is shown how CoSA may be used in a broader change detection context to infer trends and degrees of change.

For the purposes of this disclosure, the focus is on the CoSA labels obtained using 20 clusters at all four spatial resolutions, which are visualized as images 600, 610 in FIGS. 6A and 6B. Since each pixel is individually labeled based on its surrounding context pixels, the resulting label image has the same size/resolution as the original satellite image, except for the border pixels, and can as such be georeferenced for easy analysis. These results may be used to derive change maps for the region. The label images are displayed using an arbitrary 20-color colormap, where each of the 20 colors corresponds to a particular cluster label. Given that the same cluster centers are used for both images at a given resolution, the CoSA label colors are consistent at that resolution, and can be readily compared visually. Across the four resolutions, the label-color association is arbitrary as the cluster centers are distinct.

Since the CoSA labels are pixel-level and georeferenced, they could be used to track change at the resolution of the original satellite imagery for any small area of interest (e.g., map vegetation inside a particular polygon). This task may be complicated by errors in image registration and acquisition resolution. For the Barrow area, however, there is interest in tracking wide area moisture and vegetation transitions in order to assess possible climate change impacts. Accordingly, discussion is included of how CoSA could be used for broad area change detection and/or monitoring to infer general trends and degrees of change.

One approach is to consider the changes in the sizes of the clusters, that is, the number of pixels that change labels over the two week interval. The relative change may be calculated by:

$$\text{relative\_change} = (\text{cluster\_size}_{t_2} - \text{cluster\_size}_{t_1})/\text{cluster\_size}_{t_1} \quad (4)$$

where time $t_2$ is subsequent to time $t_1$.

The relative percent changes in label count may be useful to estimate the rate at which changes are occurring, for example. The scale of changes is also of interest, i.e., the size of the impacted areas with respect to a nominal 1.82 meter resolution:

$$\text{area\_change} = (\text{cluster}_{size_{t_2}} - \text{cluster}_{t_1}) \times \text{pixel\_area} \quad (5)$$

Figure 8:
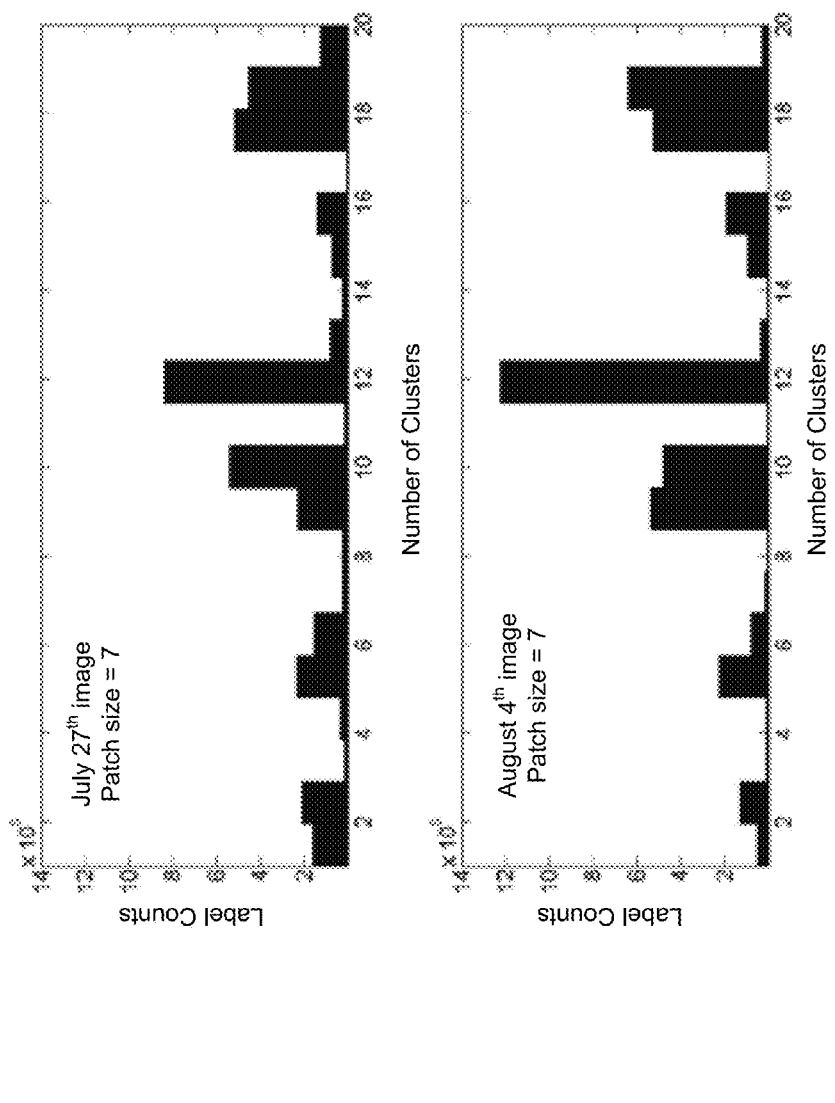
FIG. 8 is a histogram illustrating label counts in each cluster for the Jul. 21, 2010, image on the top panel and the Aug. 4, 2010, image on the bottom panel, for the example case of a 7×7 pixel patch size, according to an embodiment of the present invention.

FIG. 8 shows histograms 800 of label counts for the Jul. 21, 2010, image (top), and the Aug. 4, 2010, image (bottom) for the case of 20 clusters at 7×7 pixel spatial resolution. Over the two week interval between the acquisitions of these two satellite images, clusters 1-8 decreased in label count, which is consistent with the moist soils drying up as the Arctic summer progresses. Similarly, an increase in the vegetation and dry soil clusters (9-12) occurred, with cluster 12 corresponding to the yellow label (grayscale here) in the bottom left panels of FIGS. 6A and 6B. Cluster 18 remains relatively unchanged, as it captures the deep waters of the bay and the big lakes. A drop in clusters 19 and 20 (maroon clusters in the label images, grayscale here) is also seen, which possibly represent inundated areas in mid-July that lose some of their moisture by early August.

Figure 9:
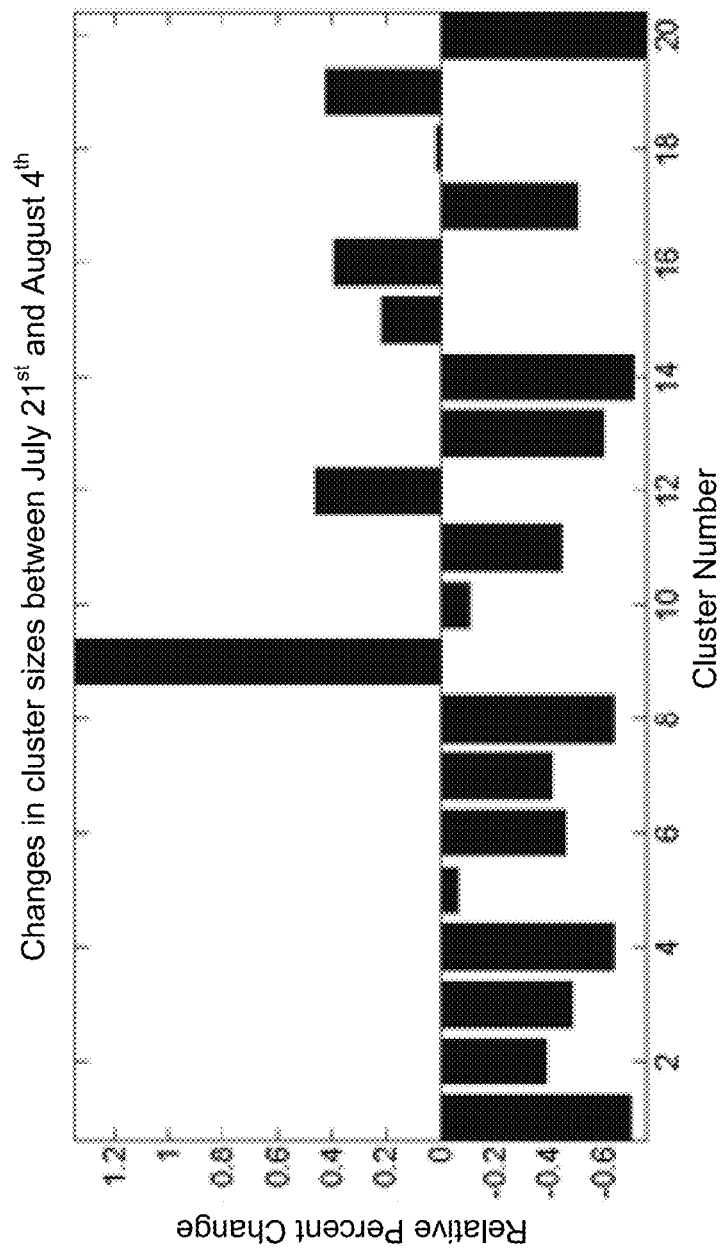
FIG. 9 is a histogram illustrating relative percent change in label counts in each cluster between the Jul. 21, 2010, image and the Aug. 4, 2010, image at the 7×7 pixel patch size, according to an embodiment of the present invention.
Figure 10:
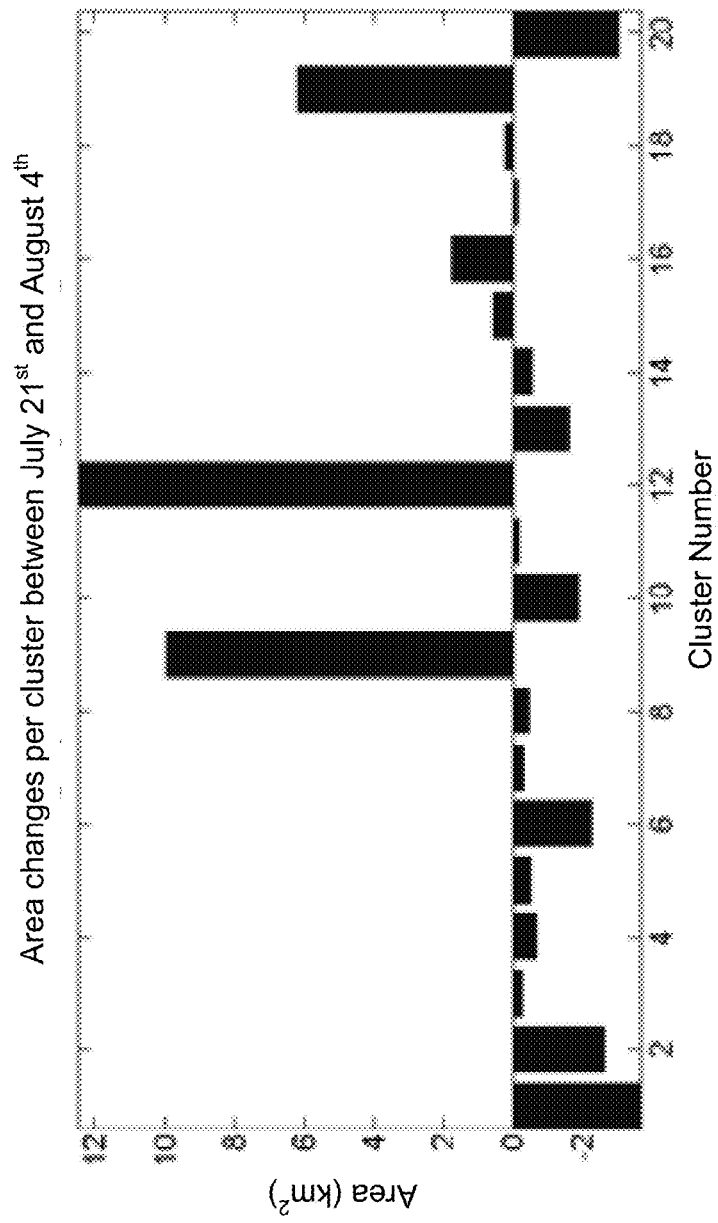
FIG. 10 is a histogram illustrating equivalent area change in km² in each cluster between the Jul. 21, 2010, image and the Aug. 4, 2010, image at the 7×7 pixel patch size, according to an embodiment of the present invention.

FIG. 9 shows a histogram 900 of the percentage of change in cluster sizes over the two week period under consideration, where the change was calculated relative to the Jul. 21, 2010, image. The sign of the relative changes is therefore positive if the cluster has grown in size, and negative if the cluster size decreased. The relative change can be used to determine equivalent spatial extent of land surface cover changes. For example, cluster number 20 seems to be correlated to inundated areas, or very moisture saturated areas. In Jul. 21, 2010, there were 124,792 pixels marked with label 20, and by Aug. 4, 2010, that number had decreased to only 30,387 pixels. The respective relative percent change may then be calculated as (30,387−124792)/124792=−0.757. This indicates that 94,405 pixels are no longer mapped as very moist or inundated. Given that each pixel roughly corresponds to 1.8 m×1.8 m (i.e., 3.24 m$^2$) area, it may be inferred that an area of about 0.3 km$^2$ dried considerably over the two week interval. Histogram 1000 of FIG. 10 shows the area changes between July and August for each of the 20 clusters.

Figure 11:
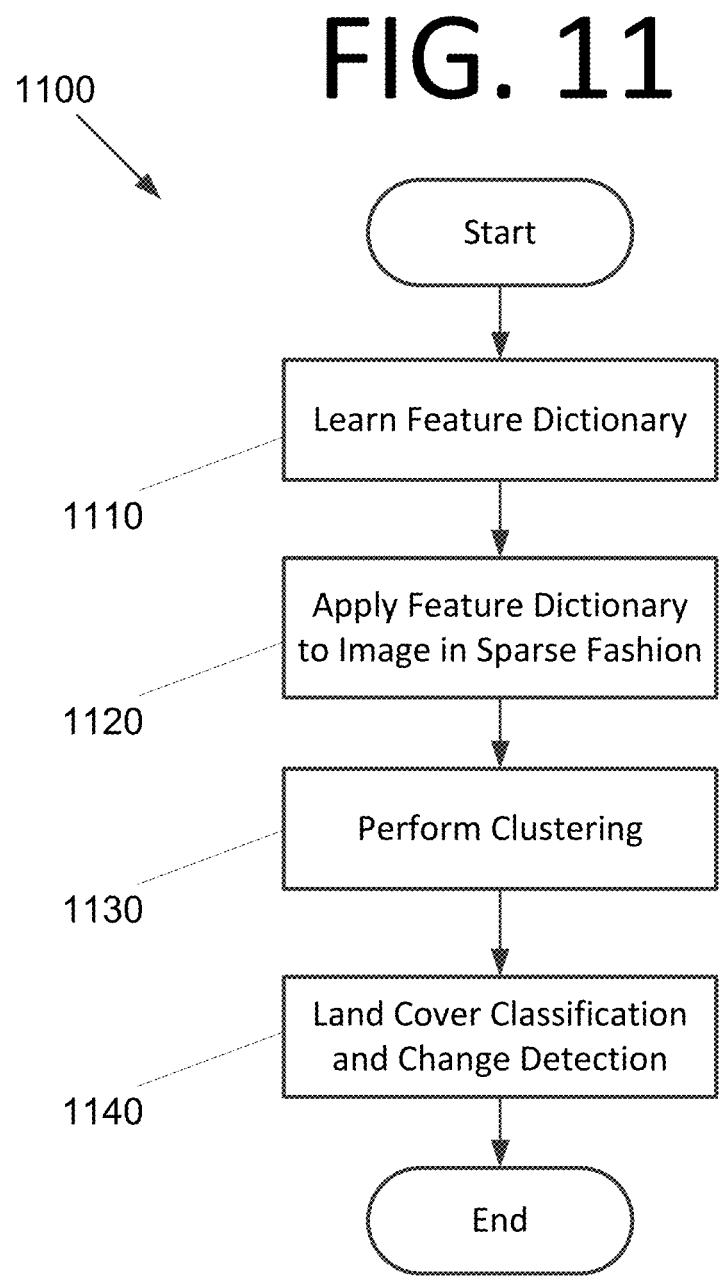
FIG. 11 is a flowchart illustrating a process for learning, categorizing, and identifying multispectral or hyperspectral, multiresolution features from satellite data, according to an embodiment of the present invention.

FIG. 11 is a flowchart illustrating a process 1100 for learning, categorizing, and identifying multispectral or hyperspectral, multiresolution features from satellite data, according to an embodiment of the present invention. The process begins with learning representative land features from multi-band patches of image data at 1110 using a batch Hebbian algorithm. Next, representative features from the learned feature dictionary are applied to image patches from an image in a sparse fashion at 1120. The sparse representations of pixel patches are then used to perform unsupervised k-means clustering into land cover categories at 1130. Land cover classification and change detection are then performed in this sparse domain at 1140 once the image was clustered. To detect change, an image from a first date may be compared with an image from a second date. Per the above, if the algorithm is properly trained, changes in various geographic or man-made features may be detected over time, such as melting of ice, progress in constructing a building, or any other desired change that the algorithm has been trained to recognize.

Figure 12:
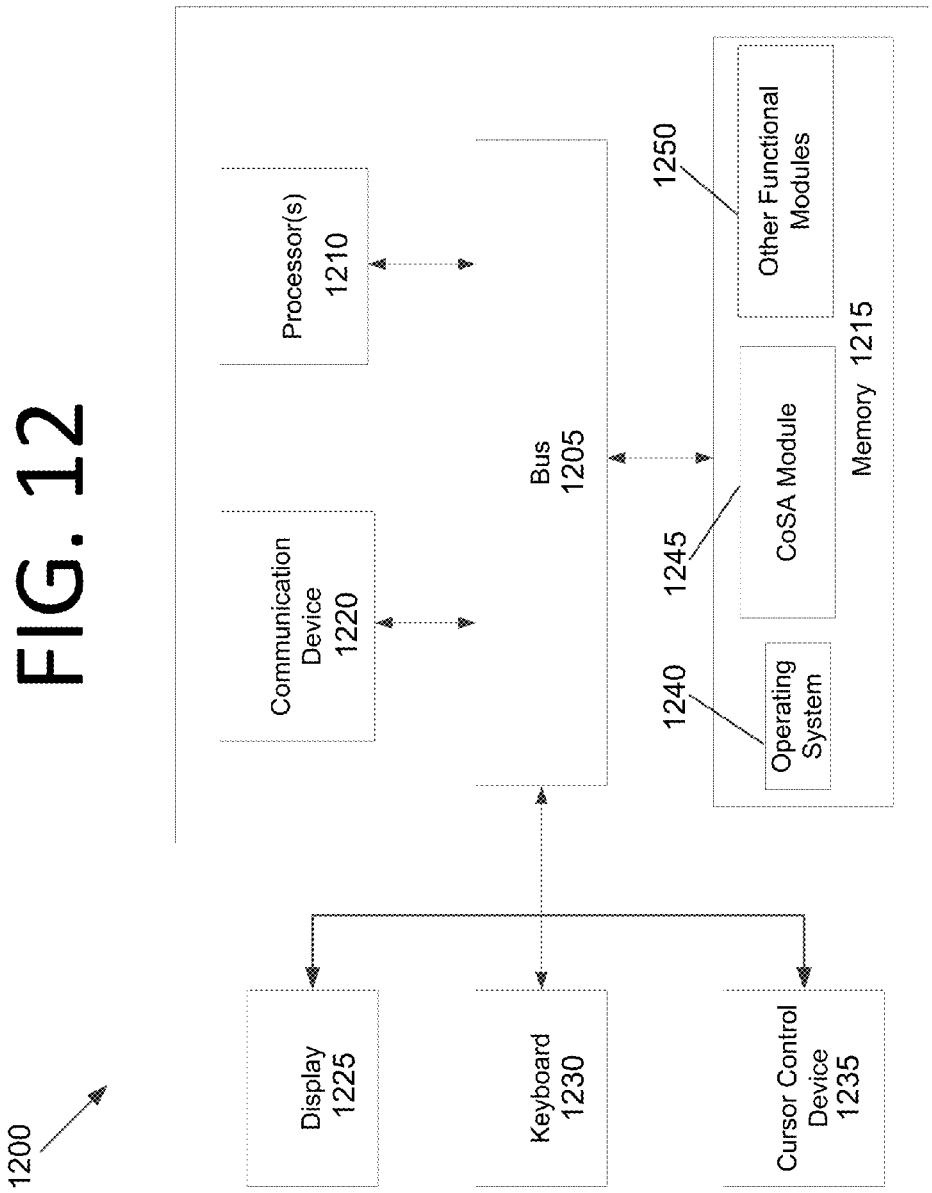
FIG. 12 is a block diagram of a computing system configured to learn, categorize, and identify multispectral or hyperspectral, multiresolution features from image data, according to an embodiment of the present invention.

FIG. 12 is a block diagram of a computing system 1200 configured to learn, categorize, and identify multispectral or hyperspectral, multiresolution features from image data, according to an embodiment of the present invention. Computing system 1200 includes a bus 1205 or other communication mechanism for communicating information, and processor(s) 1210 coupled to bus 1205 for processing information. Processor(s) 1210 may be any type of general or specific purpose processor, including a central processing unit ("CPU") or application specific integrated circuit ("ASIC"). Processor(s) 1210 may also have multiple processing cores, and at least some of the cores may be configured to perform specific functions. Computing system 1200 further includes a memory 1215 for storing information and instructions to be executed by processor(s) 1210. Memory 1215 can be comprised of any combination of random access memory (RAM), read only memory (ROM), flash memory, cache, static storage such as a magnetic or optical disk, or any other types of non-transitory computer-readable media or combinations thereof. Additionally, computing system 1200 includes a communication device 1220, such as a transceiver and antenna, to wirelessly provide access to a communications network.

Non-transitory computer-readable media may be any available media that can be accessed by processor(s) 1210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1210 are further coupled via bus 1205 to a display 1225, such as a Liquid Crystal Display (LCD), for displaying information to a user. A keyboard 1230 and a cursor control device 1235, such as a computer mouse, are further coupled to bus 1205 to enable a user to interface with computing system. However, in certain embodiments such as those for mobile computing implementations, a physical keyboard and mouse may not be present, and the user may interact with the device solely through display 1225 and/or a touchpad (not shown). Any type and combination of input devices may be used as a matter of design choice.

Memory 1215 stores software modules that provide functionality when executed by processor(s) 1210. The modules include an operating system 1240 for computing system 1200. The modules further include a CoSA module 1245 that is configured to learn, categorize, and identify multispectral or hyperspectral, multiresolution features from image data. Computing system 1200 may include one or more additional functional modules 1250 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 11 may be performed by a computer program, encoding instructions for the nonlinear adaptive processor to perform at least the process described in FIG. 11, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the process described in FIG. 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

An approach for land cover classification and season change detection and monitoring in some embodiments uses CoSA. The clustering process behaves as a classifier in detecting real variability, but some of the associations may be grouped together or are not important for one type of classification versus another (e.g., vegetation analysis versus variability in the topography). The discussion above indicates that the degree of land cover heterogeneity should inform the choice of spatial patch resolution, and potentially the size of the learned dictionary.

It will be readily understood that the components of various embodiments of the present invention as claimed, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    learning representative land features, by a computing system, from multi-band patches or pixels of image data to form a learned feature dictionary;
    applying representative features from the learned feature dictionary, by the computing system, to image patches or pixels from an image in a sparse fashion to form a sparse representation;
    clustering the sparse representation of the features in the image, by the computing system, into land cover categories; and
    performing land cover classification and change detection in the sparse domain, by the computing system, after the image is clustered and outputting results.

2. The computer-implemented method of claim 1, wherein the learning of the representative land features further comprises applying a Hebbian algorithm to learn representative land features directly from the multi-band patches or pixels of image data.

3. The computer-implemented method of claim 2, wherein the learning of the representative land features further comprises using available spectral bands in the image data in combinations to form normalized band difference indices.

4. The computer-implemented method of claim 1, wherein the learned feature dictionary is learned from at least one million overlapping image patches or pixels, and the applying of the representative features comprises using a pursuit search.

5. The computer-implemented method of claim 1, wherein the clustering of the features in the image comprises using unsupervised k-means clustering.

6. The computer-implemented method of claim 1, wherein the forming of the learned feature dictionary comprises:
   initializing the learned feature dictionary, by the computing system, by imprinting;
   learning the learned feature dictionary, by the computing system, using a batch/online Hebbian algorithm that minimizes a cost function E for sparse representation of an input vector $x_i$ given by:

$$E = \min_a \|x - \Phi a\|_2^2 + \lambda S(a), \, S(a) = \left(\sum_i |a_i|^p\right)^{1/p}$$

where E measures a mean-square reconstruction error and $S(\bullet)$ is a sparsity-inducing constraint using p norm on a coefficient vector $a_1$.

7. The computer-implemented method of claim 6, wherein an approximate solution for a sparse coefficient vector is obtained via a greedy matching pursuit algorithm.

8. The computer-implemented method of claim 6, wherein a dictionary update for every dictionary element is obtained by performing gradient descent on E for a batch of training vectors.

9. The computer-implemented method of claim 1, wherein a plurality of different spatial resolutions is used to learn distinct feature dictionaries.

10. The computer-implemented method of claim 1, further comprising:
    extracting, by the computing system, values for each pixel in a given cluster for available band indices R, comprising a normalized difference vegetation index (NDVI), a normalized difference wetness index (NDWI), a normalized difference soil index (NDSI), and a nonhomogeneous feature distance (NHFD) band ratio; and
    representing the given cluster, by the computing system, in R-dimensional space, such that the representation is defined by (NDVI, NDWI, NDSI, NHFD); and
    using a distance metric in a band difference index R-dimensional space as a separability and performance metric.

11. The computer-implemented method of claim 1, wherein the change detection is performed by calculating a relative change given by:

$$\text{relative\_change} = (\text{cluster\_size}_{t_2} - \text{cluster\_size}_{t_1})/\text{cluster\_size}_{t_1}$$

where time $t_2$ is subsequent to time $t_1$.

12. The computer-implemented method of claim 1, wherein the change detection is determined by relative percent changes in label count comprising a change in area, given by:

$$\text{area\_change} = \left(\text{cluster}_{size_{t_2}} - \text{cluster}_{size_{t_1}}\right) \times \text{pixel}_{area}.$$

* * * * *